United States Patent
MacLachlan et al.

(10) Patent No.: US 9,758,386 B2
(45) Date of Patent: Sep. 12, 2017

(54) CHIRAL NEMATIC NANOCRYSTALLINE METAL OXIDES

(71) Applicants: UNIVERSITY OF BRITISH COLUMBIA, Vancouver (CA); FPINNOVATIONS, Pointe-Claire (CA)

(72) Inventors: Mark John MacLachlan, Vancouver (CA); Kevin Eric Shopsowitz, Vancouver (CA); Wadood Yasser Hamad, Vancouver (CA)

(73) Assignee: FPINNOVATIONS, Pointe-Claire, QC (CA)

( * ) Notice: Subject to any disclaimer, the term of this patent is extended or adjusted under 35 U.S.C. 154(b) by 1095 days.

(21) Appl. No.: 13/644,300

(22) Filed: Oct. 4, 2012

(65) Prior Publication Data
US 2013/0089492 A1     Apr. 11, 2013

Related U.S. Application Data

(60) Provisional application No. 61/543,955, filed on Oct. 6, 2011.

(51) Int. Cl.
   *C01G 23/04* (2006.01)
   *C04B 38/04* (2006.01)
   (Continued)

(52) U.S. Cl.
   CPC .............. *C01G 23/04* (2013.01); *C01B 13/00* (2013.01); *C01B 13/14* (2013.01); *C01B 37/02* (2013.01);
   (Continued)

(58) Field of Classification Search
   None
   See application file for complete search history.

(56) References Cited

U.S. PATENT DOCUMENTS

| | | |
|---|---|---|
| 8,063,114 B2 | 11/2011 | Tatsumi et al. |
| 8,530,005 B2 | 9/2013 | Beck et al. |
| | (Continued) | |

FOREIGN PATENT DOCUMENTS

| | | |
|---|---|---|
| CN | 1590301 | 9/2005 |
| JP | 2006131499 | 5/2006 |
| | (Continued) | |

OTHER PUBLICATIONS

Kang et al("Ordered mesoporous WO3-x possessing electronically conductive framework comparable to carbon framework toward long-term stable cathode supports for fuel cells", J Mat Chem, vol. 20, No. 35 (2010), p. 7416-7421).*

(Continued)

*Primary Examiner* — Melvin C Mayes
*Assistant Examiner* — Michael Forrest
(74) *Attorney, Agent, or Firm* — Norton Rose Fulbright Canada LLP

(57) ABSTRACT

A mesoporous metal oxide materials with a chiral organization; and a method for producing it, in the method a polymerizable metal oxide precursor is condensed inside the pores of chiral nematic mesoporous silica by the so-called "hard templating" method. As a specific example, mesoporous titanium dioxide is formed inside of a chiral nematic silica film templated by nanocrystalline cellulose (NCC). After removing the silica template such as by dissolving the silica in concentrated aqueous base, the resulting product is a mesoporous titania with a high surface area. These mesoporous metal oxide materials with high surface area and chiral nematic structures that lead to photonic properties may be useful for photonic applications as well as enantioselective catalysis, photocatalysis, photovoltaics, UV filters, batteries, and sensors.

14 Claims, 32 Drawing Sheets

NCC-Silica Composite  Pyrolysis or acid hydrolysis

Mesoporous Silica  1. TiCl₄ Infiltration 2. Calcination 3. Silica Etching

Si-P
Si-A

Mesoporous Titania

Ti-P
Ti-A

(51) Int. Cl.

| | |
|---|---|
| *C01B 37/02* | (2006.01) |
| *C01G 33/00* | (2006.01) |
| *C01G 23/047* | (2006.01) |
| *C01G 25/02* | (2006.01) |
| *C01G 19/02* | (2006.01) |
| *C01B 13/00* | (2006.01) |
| *C01G 31/02* | (2006.01) |
| *C01G 35/00* | (2006.01) |
| *C01G 49/02* | (2006.01) |
| *C01B 13/14* | (2006.01) |
| *C01G 1/02* | (2006.01) |

(52) U.S. Cl.
CPC .............. *C01G 1/02* (2013.01); *C01G 19/02* (2013.01); *C01G 23/047* (2013.01); *C01G 25/02* (2013.01); *C01G 31/02* (2013.01); *C01G 33/00* (2013.01); *C01G 35/00* (2013.01); *C01G 49/02* (2013.01); *C04B 38/045* (2013.01); *C01P 2002/72* (2013.01); *C01P 2002/85* (2013.01); *C01P 2004/02* (2013.01); *C01P 2004/03* (2013.01); *C01P 2006/12* (2013.01); *C01P 2006/14* (2013.01); *C01P 2006/16* (2013.01); *C01P 2006/60* (2013.01)

(56) References Cited

U.S. PATENT DOCUMENTS

| | | | |
|---|---|---|---|
| 8,557,212 | B2 | 10/2013 | Pak et al. |
| 2004/0024076 | A1* | 2/2004 | Davis .................. 521/154 |
| 2006/0116284 | A1 | 6/2006 | Pak et al. |
| 2009/0043003 | A1 | 2/2009 | Tatsumi et al. |
| 2009/0142565 | A1 | 6/2009 | Takahashi et al. |
| 2010/0279019 | A1 | 11/2010 | Beck et al. |
| 2011/0248214 | A1 | 10/2011 | Maclachlan et al. |
| 2011/0281205 | A1 | 11/2011 | Pak et al. |
| 2013/0281291 | A1 | 10/2013 | Pak et al. |
| 2013/0313477 | A1 | 11/2013 | Beck et al. |
| 2015/0064093 | A1 | 3/2015 | Maclachlan et al. |

FOREIGN PATENT DOCUMENTS

| | | |
|---|---|---|
| JP | 2012525448 | 10/2012 |
| JP | 2014517802 | 7/2014 |
| WO | 2005105672 | 11/2005 |
| WO | 2007020894 | 2/2007 |

OTHER PUBLICATIONS

Yue et al("Mesoporous monocrystalline TiO2 and its solid-state electrochemical properties", Chem Mat, vol. 21 (2009), p. 2540-2546).*
Yue et al("Synthesis, Li insertion, and photoactivity of mesoporous crystalline TiO2" Adv Func Mat, vol. 19 (2009) p. 2826-2833).*
Tian et al("General Synthesis of Ordered Crystallized Metal Oxide Nanoarrays Replicated by Microwave-Digested Mesoporous Silica" Adv Mat, (2003) 15, No. 15, pp. 1370-1374).*
Dujardin et al("Synthesis of mesoporous silica by sol-gel mineralization of cellulose nanorod nematic suspensions", J Mat Chem, (2003), 13, 696-699).*
Krause et al(Spatially Graded Nanostructured Chiral Films as Tunable Circular Polarizers, Adv Funct Mater. 2008, 18, 3111-3118).*
Shopsowitz, K.E., "Hard templating of nanocrystalline titanium dioxide with chiral nematic ordering", Angewandte Chemie—International Edition, vol. 51, No. 28, Jul. 9, 2012 (Jul. 9, 2012), pp. 6886-6890.
An, Z. et al., "Self-supported helical oxide arrays templated by pore-swollen chiral mesoporous silica", Chemical Communications, Issue 9, 2009, pp. 1055-1057.
Kang, E. et al. "Ordered mesoporous WO3-x possessing electronically conductive framework comparable to carbon framework toward long-term stable cathode supports for fuel cells", Journal of Materials Chemistry, vol. 20, No. 35, 2010, pp. 7416-7421.
Wu, Y. et al., "Composite mesostructures by nano-confinement", Nature Materials, vol. 3, No. 11, Nov. 2004 (Nov. 2004), pp. 816-822.
Che et al., "Synthesis and characterization of chiral mesoporous silica", Nature, vol. 429, May 20, 2004 (May 20, 2004), pp. 281-284.
International Search Report, PCT/CA2012/000919, dated Jan. 4, 2013.
Lu, A.-H., Scüth, F., Nanocasting: A Versatile Strategy for Creating Nanostructured Porous Materials. Adv. Mater. 18, 1793-1805 (2006).
Yang, H., Zhao, D. Synthesis of replica mesostructures by the nanocasting strategy. J. Mater. Chem. 15, 1217-1231 (2005).
Caruso, R. A., Nanocasting and Nanocoating. Top. Curr. Chem. 226, 91-118 (2003).
Ryoo, R., Joo, S. H., Jun, S., Synthesis of Highly Ordered Carbon Molecular Sieves via Template-Mediated Structural Transformation. J. Phys. Chem. B 103, 7743-7746 (1999).
Lee, J., Yoon, S., Hyeon, T., Oh, S. M., Kim, K. B., Synthesis of a new mesoporous carbon and its application to electrochemical double-layer capacitors. Chem. Commun. 2177-2178 (1999).
Liu, H., Wang, G., Liu, J., Qiao, S., Ahn, H., Highly ordered mesoporous NiO anode material for lithium ion batteries with an excellent electrochemical performance. J. Mater. Chem. 21, 3046-3052 (2011).
Li, W.-C., Nong, G.-Z., Lu, A.-H., Hu, H.-Q., Synthesis of nanocast ordered mesoporous carbons and their application as electrode materials for supercapacitor. J. Porous Mater. 18, 23-30 (2011).
Armatas, G. S., Katsoulidis, A. P., Petrakis, D. E., Pomonis, P. J., Kanatzidis, M. G., Nanocasting of Ordered Mesoporous Co3O4-Based Polyoxometalate Composite Frameworks. Chem. Mater. 22, 5739-5746 (2010).
Waltz, T., Becker, B., Wagner, T., Sauerwald, T., Kohl, C.-D., Tiemann, M., Ordered nanoporous SnO2 gas sensors with high thermal stability. Sens. Actuators B 150, 788-793 (2010).
Garcia, T., Agouram, S., Sánchez-Royo, J. F., Murillo, R., Mastral, A. M., Aranda, A., Vázquez, I., Dejoz, A., Solsona, B., Deep oxidation of volatile organic compounds using ordered cobalt oxides prepared by a nanocasting route. Appl. Cat. A: General 386, 16-27 (2010).
Kresge, C. T., Leonowicz, M. E., Roth, W. J., Vartuli, J. C., Beck, J. S., Ordered mesoporous molecular sieves synthesized by a liquid-crystal template mechanism. Nature 359, 710-712 (1992).
Wan, Y., Zhao, D., On the Controllable Soft-Templating Approach to Mesoporous Silicates. Chem. Rev. 107, 2821-2860 (2007).
Liang, C., Li, Z., Dai, S. Mesoporous Carbon Materials: Synthesis and Modification. Angew. Chem. Int. Ed. 47, 3696-3717 (2008).
Thomas, A., Goettmann, F., Antonietti, M., Hard Templates for Soft Materials: Creating Nanostructured Organic Materials. Chem. Mater. 20, 738-755 (2008).
Han, Y.-J., Kim, J. M., Stucky, G. D., Preparation of Noble Metal Nanowires Using Hexagonal Mesoporous Silica SBA-15. Chem. Mater. 12, 2068-2069 (2000).
Sakamoto, Y., Ohsuna, T., Hiraga, K., Terasaki, O., Ko, C. H., Shin, H. J., Ryoo, R., TEM Studies of Platinum Nanowires Fabricated in Mesoporous Silica MCM-41. Angew. Chem., Int. Ed. 39, 3107-3110 (2000).
Tian, B., Liu, X., Solovyov, L. A., Liu, Z., Yang, H., Zhang, Z., Xie, S., Zhang, F., Tu, B., Yu, C., Terasaki, O., Zhao, D., Facile Synthesis and Characterization of Novel Mesoporous and Mesorelief Oxides with Gyroidal Structures. J. Am. Chem. Soc. 126, 865-875 (2004).
Tian, B., Liu, X., Yang, H., Xie, S., Yu, C., Tu, B., Zhao, D., General Synthesis of Ordered Crystallized Metal Oxide Nanoarrays Replicated by Microwave-Digested Mesoporous Silica. Adv. Mater. 15, 1370-1374 (2003).
Yue, W., Xu, X., Irvine, J. T. S., Attidekou, P. S., Liu, C., He, H., Zhao, D., Zhou, W. Mesoporous Monocrystalline TiO2 and Its Solid-State Electrochemical Properties. Chem. Mater. 21, 2540-2546 (2009).

(56) References Cited

OTHER PUBLICATIONS

Yue, W.; Random, C.; Attidekou, P. S.; Su, Z.; Irvine, J. T. S.; Zhou, W. Synthesis, Li Insertion, and Photoactivity of Mesoporous Crystalline TiO2. Adv. Funct. Mater. 19, 2826-2833 (2009).

Chae, W.-S., Lee, S.-W., Kim, Y.-R. Templating Route to Mesoporous Nanocrystalline Titania Nanofibers. Chem. Mater. 17, 3072-3074 (2005).

O'Regan, B., Grätzel, M. A low-cost, high-efficiency solar cell based on dye-sensitized colloidal TiO2 films. Nature 353, 737-740 (1991).

Zhang, S., Jiang, D., Tang, T., Li, J., Xu, Y., Shen, W., Xu, J., Deng, F. TiO2/SBA-15 photocatalysts synthesized through the surface acidolysis of Ti(OnBu)4 on carboxyl-modified SBA-15. Catal. Today 158, 329-335 (2010).

Guidi, V., Carotta, M. C., Ferroni, M., Martinelli, G., Paglialonga, L., Comini, E., Sberveglieri, G., Preparation of nanosized titania thick and thin films as gas-sensors. Sens. Actuators, B 57, 197-200 (1999).

Wang, C., Yin, L., Zhang, L., Qi, Y., Lun, N., Liu, N., Large Scale Synthesis and Gas-Sensing Properties of Anatase TiO2 Three-Dimensional Hierarchical Nanostructures. Langmuir 26, 12841-12848 (2010).

Djenizian, T., Hanzu, I., Knauth, P., Nanostructured negative electrodes based on titania for Li-ion microbatteries. J. Mater. Chem. 21, 9925-9937 (2011).

Wijnhoven, J. E. G. J., Vos, W. L., Preparation of Photonic Crystals Made of Air Spheres in Titania. Science 281, 802-804 (1998).

Schroden, R. C., Al-Daous, M., Blanford, C. F., Stein, A., Optical Properties of Inverse Opal Photonic Crystals. Chem. Mater. 14, 3305-3315 (2002).

Xu, Y., Zhu, X., Dan, Y., Moon, J. H., Chen, V. W., Johnson, A. T., Perry, J. W., Yang, S. Electrodeposition of Three-Dimensional Titania Photonic Crystals from Holographically Patterned Microporous Polymer Templates. Chem. Mater. 20, 1816-1823 (2008).

Chen, J. I. L., von Freymann, G., Choi, S. Y., Kitaev, V., Ozin, G. A., Amplified Photochemistry with Slow Photons. Adv. Mater. 18, 1915-1919 (2006).

Gabashvili, A., Major, D. T., Perkas, N., Gedanken, A. The sonochemical synthesis and characterization of mesoporous chiral titania using a chiral inorganic precursor. Ultrasonics Sonochemistry 17, 605-609 (2010).

Shopsowitz, K. E., Qi, H., Hamad, W. Y. & MacLachlan, M. J. Free-Standing Mesoporous Silica Films with Tunable Chiral Nematic Structures. Nature 468, 422-425 (2010).

Zhang, H. & Banfield, J. F. Thermodynamic analysis of phase stability of nanocrystalline titania. J. Mater. Chem. 8, 2073-2076 (1998).

English language Abstract of JP2014517802.
English language Abstract of WO2005105672.
English language Abstract of JP2006131499.
English language Abstract of JP2012525448.
English language Abstract of WO2007020894.

Shopsowitz, K.E. et al., Chiral Nematic Mesoporous Carbon Derived From Nanocrystalline Cellulose, Angew. Chem. Int. Ed., 2011, 50, 10991-10995.

\* cited by examiner

US 9,758,386 B2

CHIRAL NEMATIC NANOCRYSTALLINE METAL OXIDES

CROSS-REFERENCE TO RELATED APPLICATIONS

This application is related to U.S. application Ser. No. 13/076,469, filed Mar. 31, 2011, and U.S. provisional application 61/485,207, filed May 12, 2011, and the contents thereof are incorporated herein by reference. This application claims the benefit under 35 USC 119(e) of U.S. provisional application Ser. No. 61/543,955, filed Oct. 6, 2011.

BACKGROUND OF THE INVENTION i) Field of the Invention

The present invention relates to a new material made predominately of a metal oxide, for example titanium dioxide and having both a mesoporous structure and chirality that arise from the chiral nematic ordering of a mesoporous silica that is used as a template. The invention also relates to a composite of the metal oxide and the mesoporous silica template. Still further the invention relates to a process for producing the new material. In this invention, a precursor to a metal oxide such as titanium dioxide is polymerized inside of the pores of mesoporous chiral nematic silica to create the composite material of silica with metal oxide such as titanium dioxide in the pores. After removal of the silica template, a mesoporous metal oxide, for example titanium dioxide, is obtained that is iridescent and may be obtained as a film.

ii) Description of the Prior Art

Hard templating (also called nanocasting) has emerged as a powerful method for constructing new solid-state materials with periodic order.[1-10] Although silica can be prepared with a variety of periodic structures (e.g., lamellar, hexagonal, cubic) and pore sizes by aqueous condensation of a sol-gel precursor in the presence of a surfactant template,[11,12] there are many materials for which this method cannot be applied. By using porous silica as a hard template, diverse nanostructured materials may be obtained with a wide variety of compositions (e.g. carbon, polymers, noble metals, and metal oxides) after etching of the silica.[13-18] The thermal stability of silica also allows for the use of high temperature treatments to generate highly crystalline mesoporous products that may be difficult to obtain using other methods.

The hard templating approach has been used to synthesize novel mesoporous materials. Yue et al. recently reported the synthesis of mesoporous rutile and anatase $TiO_2$ using SBA-15 silica as the hard template,[19,20] and other hard templates have been employed in the synthesis of nanostructured titania.[21] High surface area nanocrystalline $TiO_2$ is of particular interest for applications such as dye sensitized solar cells,[22] photocatalysts,[23] gas sensors,[24,25] and batteries.[26]

The incorporation of high surface area anatase $TiO_2$ into photonic structures is a further challenge that has recently garnered attention.[27-30] By using titania in colloidal crystals and inverse opals, the high refractive index of $TiO_2$ (n=2.2 to 3.0) can allow the formation of a complete photonic bandgap in these materials.

A chiral mesoporous titania was recently described by Gedanken and co-workers, with the chirality arising from a chiral ligand that was utilized in the titanium precursor complex.[31] While these titania materials appear to possess an imprint of the chiral ligand (as shown by enantioselective adsorption studies) they do not possess any long range chiral ordering (e.g., chiral nematic order), and the material was amorphous.

To date the synthesis of mesoporous materials has been mainly limited to the ordered pore structures obtained from the lyotropic liquid crystalline phases of surfactants and block copolymers. A new form of mesoporous silica with a chiral nematic pore structure templated by the lyotropic liquid crystalline phase of nanocrystalline cellulose (NCC) was recently reported.[32,33] Condensation of a silica precursor (e.g., $Si(OMe)_4$) in the presence of NCC affords a composite material of $SiO_2$ with NCC in a chiral nematic organization. Upon removal of the cellulose template, a porous silicate is obtained as a free-standing film that has a long range chiral nematic structure resulting in photonic properties. By varying the pitch of the chiral nematic composites, mesoporous materials with tunable photonic properties are obtained.

SUMMARY OF THE INVENTION

It is an object of this invention to provide new metal oxide mesoporous materials having chirality.

It is a further object of this invention to provide a process for preparing metal oxide mesoporous materials having chiral nematic order.

It is a still further object of this invention to provide a composite of metal oxide in a mesoporous silica template defining chirality as an intermediate structure, whereby mesoporosity and chirality are provided in said metal oxide by removing the silica template.

In one aspect of the invention there is provided a mesoporous metal oxide having chirality and crystallinity.

In another aspect of the invention there is provided a process for producing a mesoporous metal oxide having chirality, comprising: introducing a metal oxide precursor into a mesoporous silica template defining chirality, converting said precursor to metal oxide, and removing said silica template.

In yet another aspect of the invention there is provided a composite comprising a matrix of mesoporous silica having chirality and a metal oxide embedded in the pores of the matrix in a chiral nematic order.

The invention is illustrated, especially for the embodiment in which the metal oxide is titanium oxide in the accompanying drawings.

DETAILED DESCRIPTION OF THE INVENTION

The invention is further described for convenience with particular reference to the embodiment in which the metal oxide is titanium oxide but it should be understood that the invention has application to other metal oxides.

The invention provides a new form of titanium dioxide that has a chiral nematic organization. By using mesoporous silica with chiral nematic organization as the host or template, a titanium oxide precursor such as titanium chloride can be hydrolyzed within the pores (so-called hard templating or nanocasting method) of the mesoporous silica to give titanium dioxide within the pores. The silica host can be subsequently removed for example, by treatment with a strong base such as sodium hydroxide in water or other conditions known to dissolve silica, to give an iridescent film that is made of titanium dioxide. X-ray diffraction of the film shows that the crystalline form of titanium dioxide present in the material is anatase. The film is iridescent, and circular dichroism (CD) measurements show that the material is chiral. Further characterization by circular dichroism and electron microscopy demonstrate that the titanium dioxide has a chiral nematic organization similar to the organization of the nanocrystalline cellulose that was used as template to form the mesoporous silica. By applying the hard templating method to chiral nematic mesoporous silica, structural features are replicated at several length scales ranging from nanometers to centimeters: (1) the titania has a surface area and pore dimensions that are determined by the porosity of the starting silica template; (2) the material obtained shows a CD signal that indicates a chiral nematic organization of the crystallites; and (3) the material is obtained as a film with similar dimensions as the starting film of mesoporous silica.

In this invention silicates with chiral nematic order are hard templates for metal oxides and other materials as demonstrated herein.

The invention thus provides metal oxides with chiral nematic organization and which are mesoporous, and which have the further advantage of being crystalline.

In addition to titanium oxide, other metal oxide structures, for example tin dioxide, iron oxide, tantalum oxide, niobium oxide, zirconium oxide, and vanadium oxide with chiral nematic organization can be prepared using this hard templating method in accordance with the invention. These materials with high surface area and chiral nematic structures that lead to photonic properties may be used for photonic applications as well as enantioselective catalysis, photocatalysis, photovoltaics, UV filters, batteries, and sensors.

Figure 1:
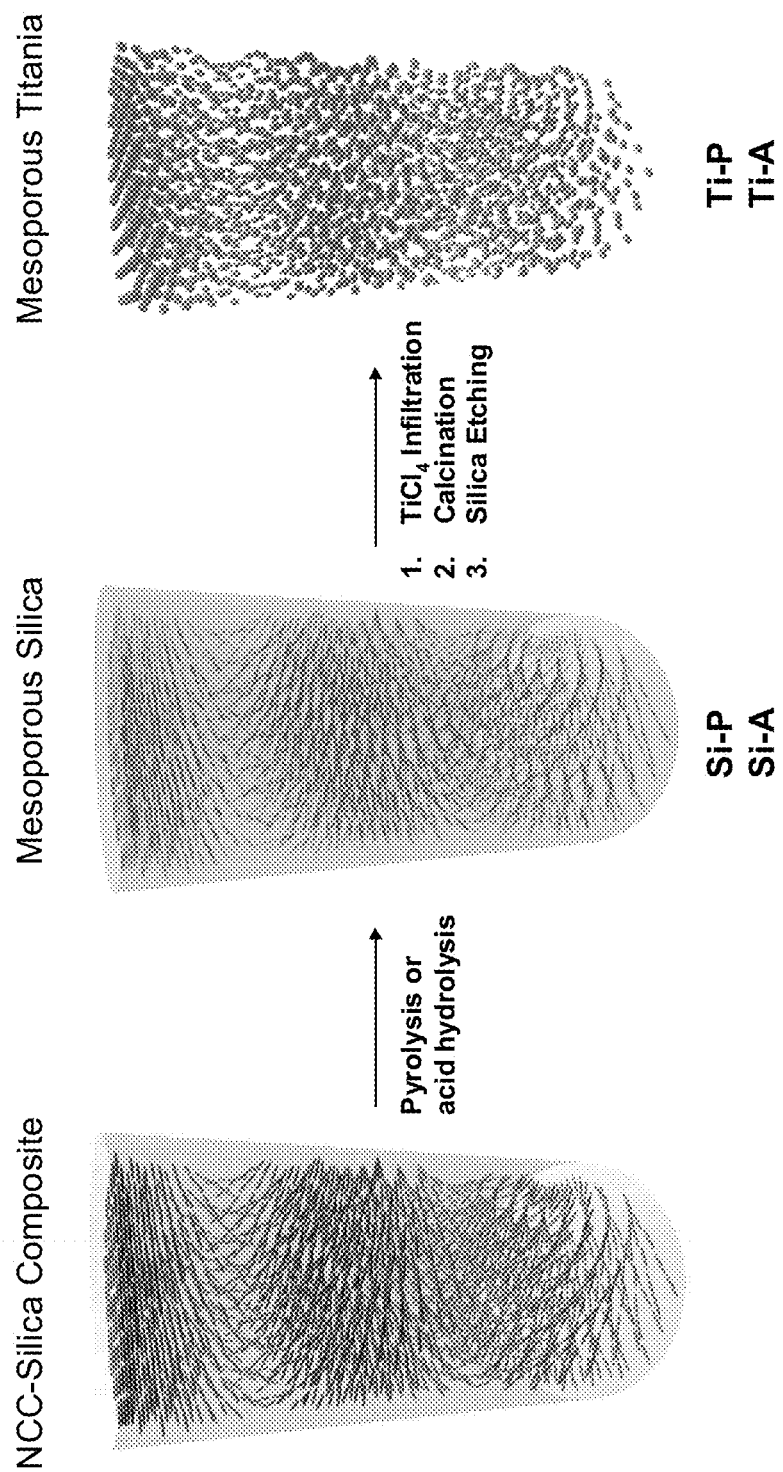
FIG. 1: is a schematic illustrating method for making mesoporous silica and mesoporous titania by the hard templating method.

The method of the invention prepares metal oxides such as titanium dioxide that are both mesoporous and organized into a chiral nematic organization, and in addition are crystalline. The method is based on the established method of hard-templating (also called nanocasting) using a mesoporous silica template, but for the first time mesoporous silica with chiral nematic organization has been used as template. This yields a titania material with new properties (e.g., iridescence and CD signal). FIG. 1 shows the general method employed. The procedure begins with a nanocrystalline cellulose (NCC)—silica composite material with chiral nematic organization. The full synthesis and characterization of the NCC-silica composite films has been described in our provisional US patent application (U.S. Provisional Ser. No. 61/322,508, filed Apr. 9, 2010).

Thus in brief, in one embodiment the mesoporous silica template may be prepared by a) reacting a siliceous precursor in an aqueous suspension of nanocrystalline cellulose (NCC) to form an aqueous mixture of siliceous material and NCC, b) casting said mixture, c) removing water from the cast mixture to produce a composite of NCC in a siliceous material matrix, said composite having chiral nematic order, and d) removing said NCC from said composite while maintaining the integrity of the siliceous material matrix. In another embodiment the mesoporous silica template may be prepared by acid hydrolysis of cellulose in a siliceous composite selected from the group consisting of silica/nanocrystalline cellulose composites and organosilica/nanocrystalline cellulose composites to produce a mesoporous siliceous material from which nanocrystalline cellulose has been removed by said acid hydrolysis.

The samples described herein were prepared starting with tetramethoxysilane as the silica precursor.

As shown in FIG. 1, the NCC template is removed either by pyrolysis of the template under air (according to the procedure described in U.S. patent application Ser. No. 13/076,469 filed Mar. 31, 2011) or by treatment with sulfuric acid as described in U.S. Provisional Patent application 61/485,207, filed May 12, 2011, the contents of which applications are incorporated herein by reference. The sample obtained by pyrolysis of the NCC is identified herein as NCC Si—P and the sample obtained by acid hydrolysis of the NCC is identified herein as NCC Si-A.

Figure 2:
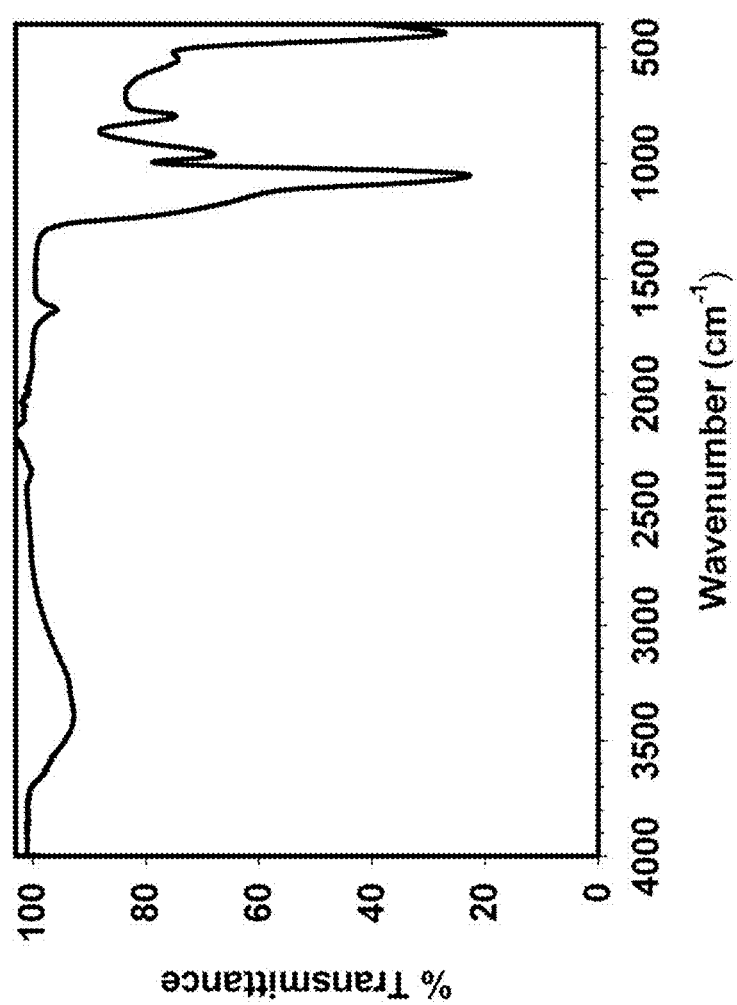
FIG. 2: is an IR spectrum of mesoporous silica sample Si-A.
Figure 3:
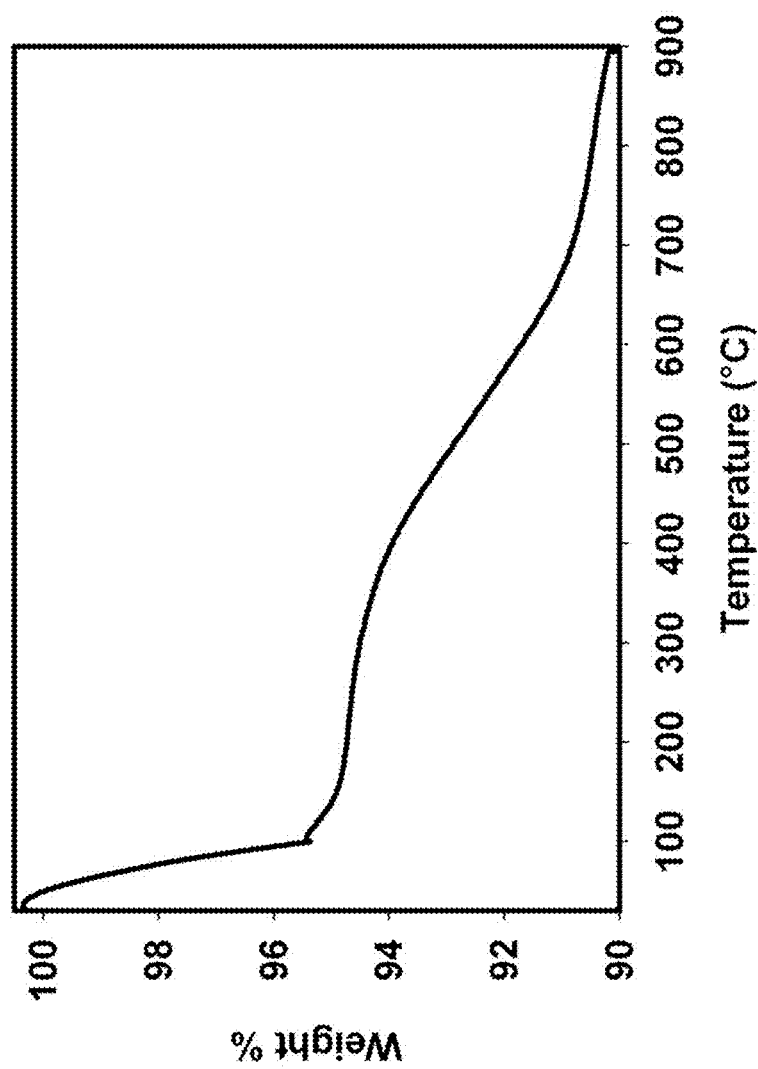
FIG. 3: is a thermogravimetric analysis of mesoporous silica sample Si-A.

Samples Si—P and Si-A were characterized by $N_2$ gas adsorption, thermogravimetric analysis (TGA), infrared (IR) spectroscopy, UV-visible spectroscopy, and circular dichroism (CD) spectroscopy. The IR spectrum of preparation Si-A (FIG. 2) verified that the cellulose was removed as vibrations typical of organic molecules (e.g., C—H stretching modes) were substantially diminished or absent. TGA of preparation Si-A (FIG. 3) showed that the cellulose was removed. Carbon analysis showed only 0.23 wt % C for preparation Si-A. Details for the characterization of Si—P were provided in the US provisional patent application, and the data showed that the cellulose was completely removed.

The materials obtained from preparation Si—P and Si-A showed chiral nematic ordering as verified by UV-visible spectroscopy. UV-visible spectra of Si—P (FIG. 4) and Si-A (FIG. 5) showed peaks due to reflection at 445 and 530 nm, respectively. The peak wavelength reflected may be controlled, for example by changing the ratio of NCC to silica employed in the synthesis as previously described in references 32 and 33.

Figure 6:
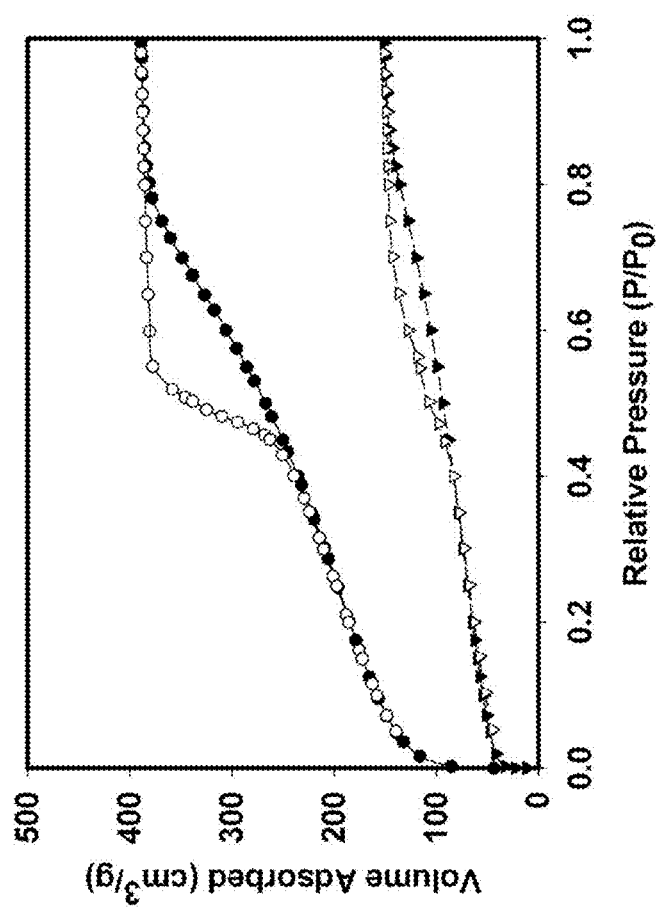
FIG. 6: is a graph of the nitrogen adsorption/desorption isotherms for Si—P (top) and Ti—P (bottom)
Figure 7:
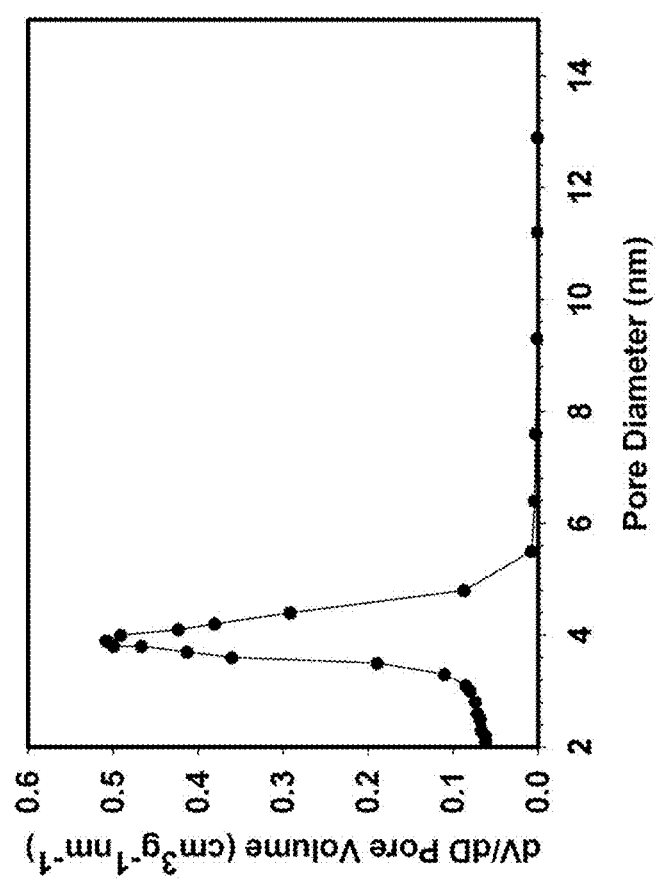
FIG. 7: is the BJH pore size distribution for Si—P as determined from the desorption branch of the $N_2$ isotherm at 77 K.
Figure 8:
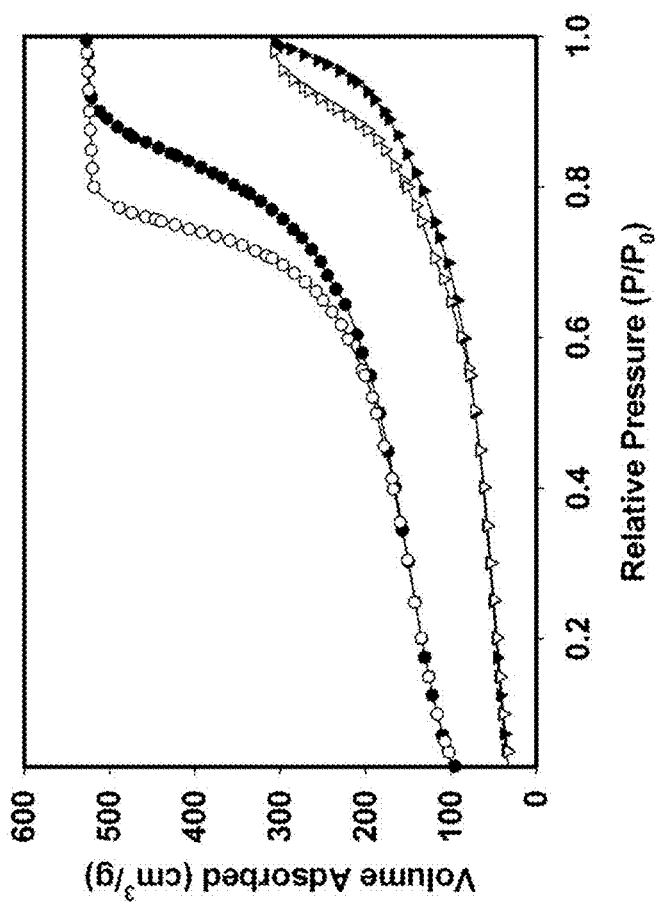
FIG. 8: is a graph of the nitrogen adsorption/desorption isotherms for Si-A (top) and Ti-A (bottom)
Figure 9:
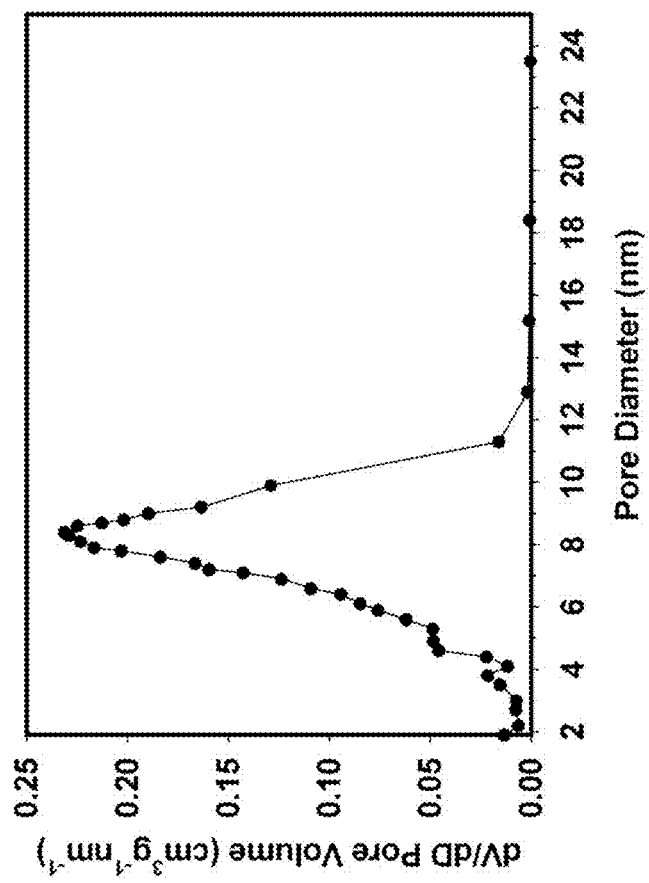
FIG. 9: is the BJH pore size distribution for Si-A as determined from the desorption branch of the $N_2$ isotherm at 77 K.

$N_2$ gas adsorption was performed on the mesoporous silicas obtained from preparations Si—P and Si-A. The upper trace in FIG. 6 shows the $N_2$ adsorption/desorption isotherm of sample Si—P, and FIG. 7 shows the pore size distribution for Si—P as determined by BJH analysis of the desorption branch of the isotherm. The upper trace in FIG. 8 shows the $N_2$ adsorption/desorption isotherm of sample Si-A, and FIG. 9 shows the pore size distribution for Si-A as determined by BJH analysis of the desorption branch of the isotherm. Notably, both samples are mesoporous, but the peak pore size in Si—P (ca. 4 nm) is smaller than that in Si-A (ca. 9 nm).

Figure 10:
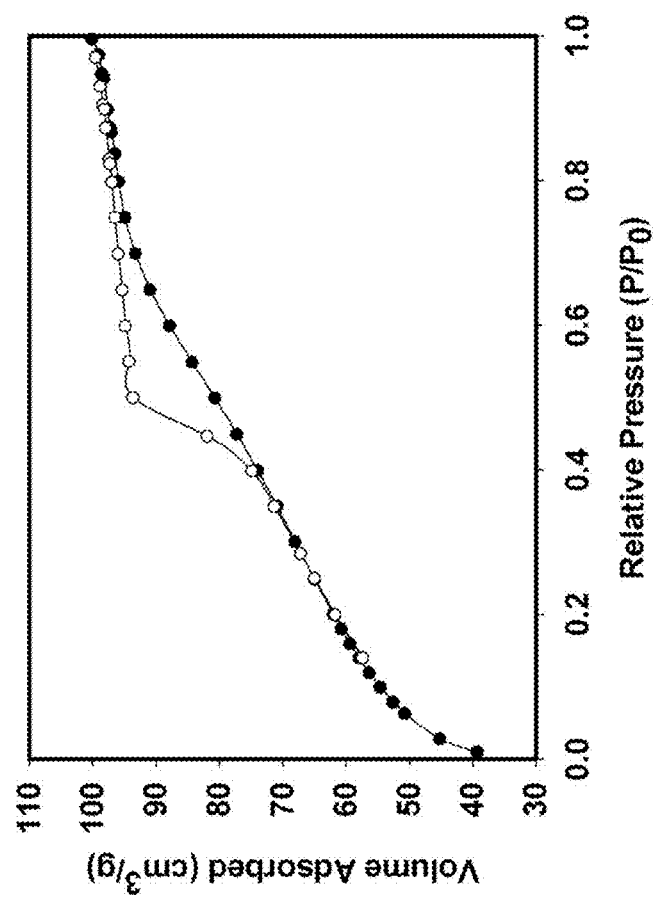
FIG. 10: is the nitrogen adsorption/desorption isotherm for Ti—P before removing silica.
Figure 11:
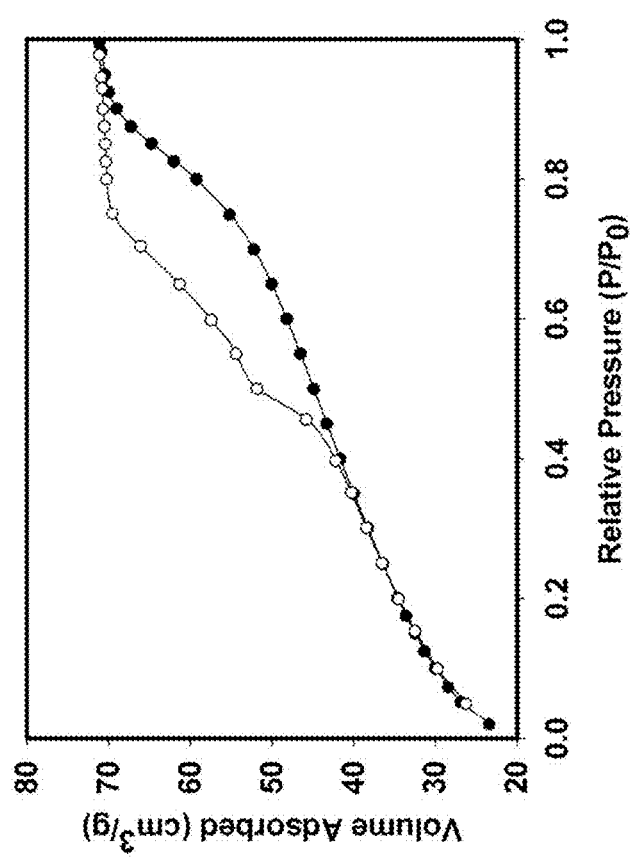
FIG. 11: is the nitrogen adsorption/desorption isotherm for Ti-A before removing silica.

Titania replicas were synthesized using free-standing chiral nematic mesoporous silica films with different pore sizes, Si-A and Si—P, as hard templates (denoted as Ti-A and Ti—P, respectively). The procedure employed was a variation of that reported by Yue et al.[19] An aqueous solution of $TiCl_4$ was prepared and loaded into the mesoporous silica films using the incipient wetness method. After each loading step the films were dried and then annealed at 200° C. After repeating the loading four times, pore filling fractions of 75% and 86% were found for Si—P and Si-A, respectively, using nitrogen adsorption (FIG. 10 and FIG. 11). After the final loading step, the silica-titania composite films were annealed at 600° C. to obtain a crystalline product. IR spectroscopy of Si—P and Si-A showed peaks attributed to Si—O stretching modes near 1000-1100 $cm^{-1}$, FIG. 12 and FIG. 13.

The silica templates were then removed by stirring the composite film with an aqueous solution of 2 M NaOH, resulting in iridescent $TiO_2$ films. The $TiO_2$ films appear more opaque than the nearly transparent silica films used as hard templates. The removal of the silica template was confirmed by IR spectroscopy, which showed the loss of the Si—O stretching mode observed in the $SiO_2/TiO_2$ composite films (see FIG. 14 and FIG. 15).

Figure 16:
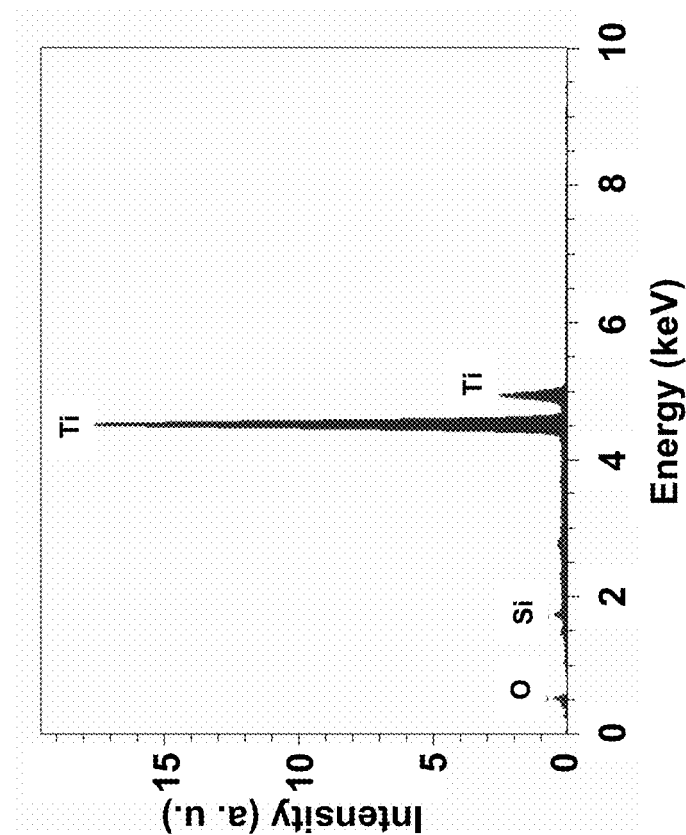
FIG. 16: is the energy dispersive X-ray analysis of sample Ti-A.

Energy dispersive X-ray (EDX) analysis of the materials shows peaks corresponding to Ti, O, and a trace amount of residual Si (FIG. 16); the Si:Ti ratio averaged over multiple locations is 0.02.

As a control, an additional sample (Ti—C) was prepared using identical conditions to the preparations of Ti—P and Ti-A, but in the absence of any hard template.

Figure 17:
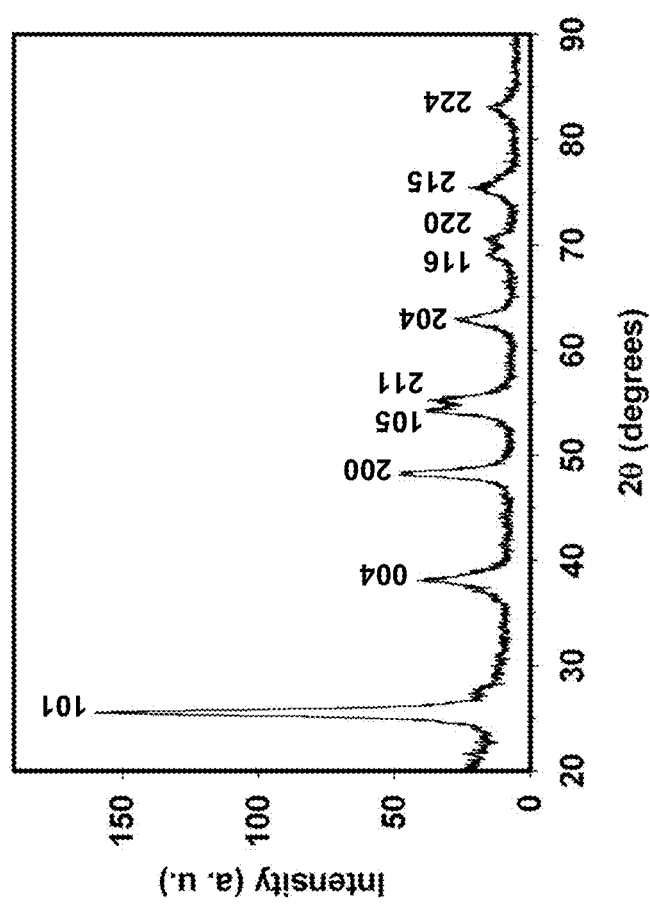
FIG. 17: is the powder X-ray diffractogram of sample Ti-A.
Figure 18:
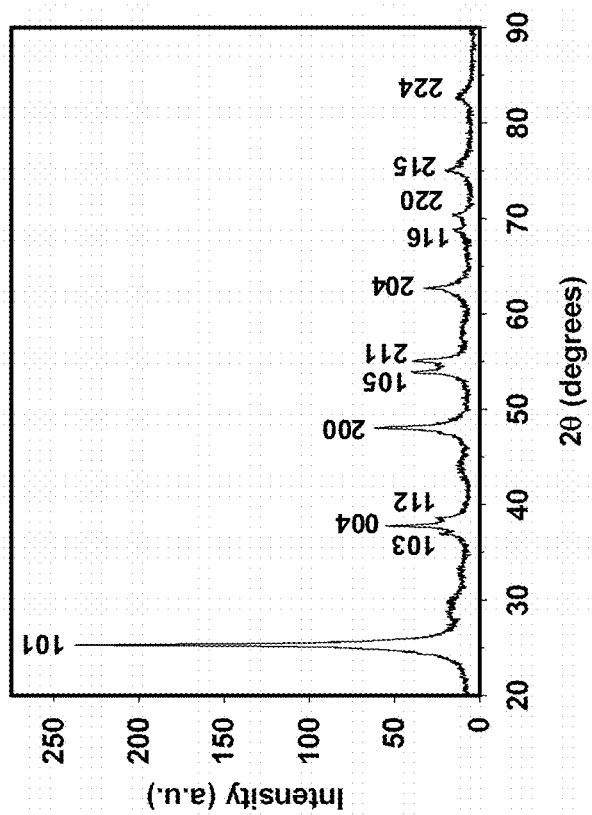
FIG. 18: is the powder X-ray diffractogram of sample Ti—P.
Figure 19:
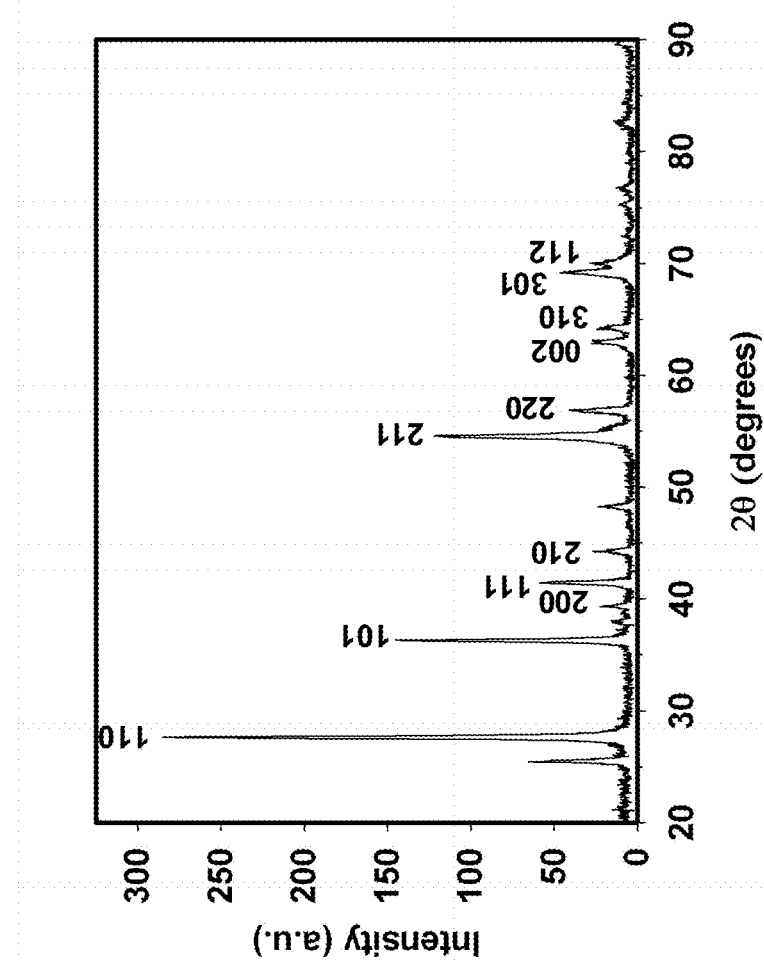
FIG. 19: is the powder X-ray diffractogram of sample Ti—C.

Powder X-ray diffraction (PXRD) confirms that the templated $TiO_2$ products, Ti-A and Ti—P, are crystalline anatase with no indication of other $TiO_2$ phases (FIG. 17 and FIG. 18). On the other hand, the $TiO_2$ synthesized without a template (Ti—C) predominantly formed rutile (FIG. 19). Although in general rutile is the most stable form of $TiO_2$, calculations show that anatase becomes more stable than rutile at crystal sizes below 15 nm.[34] Thus, for Ti-A and Ti—P, confinement within the mesopores of the silica templates induces anatase to form under conditions that otherwise favour the formation of rutile. This is further verification that the $TiO_2$ is formed inside the mesopores of the silica host.

Figure 20:
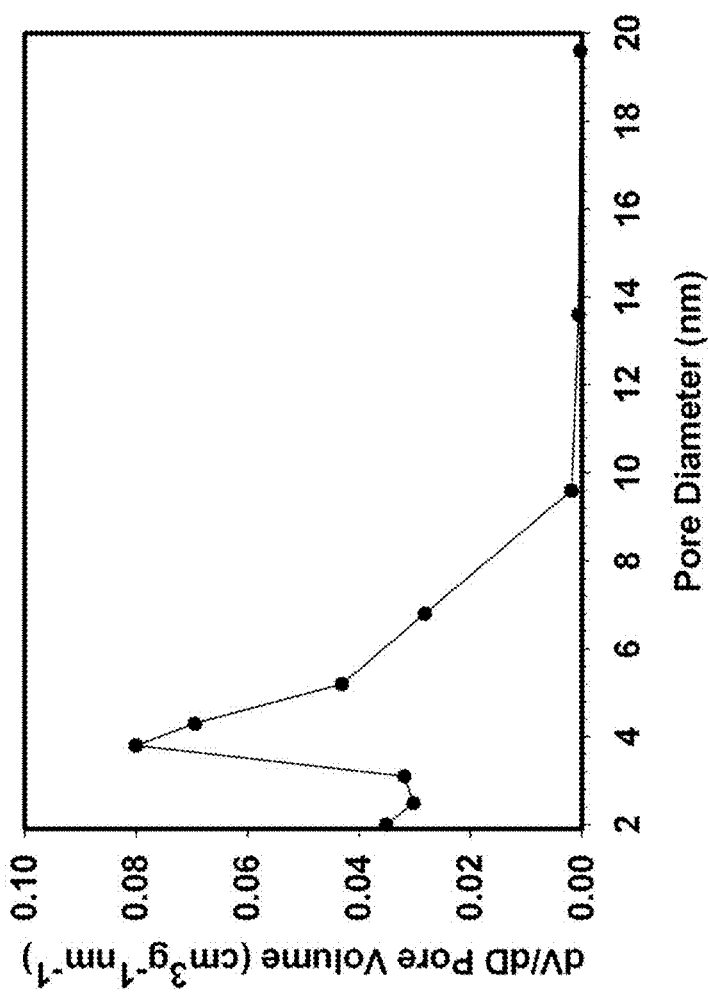
FIG. 20: is the BJH pore size distribution for Ti—P as determined from the desorption branch of the $N_2$ isotherm at 77 K.
Figure 21:
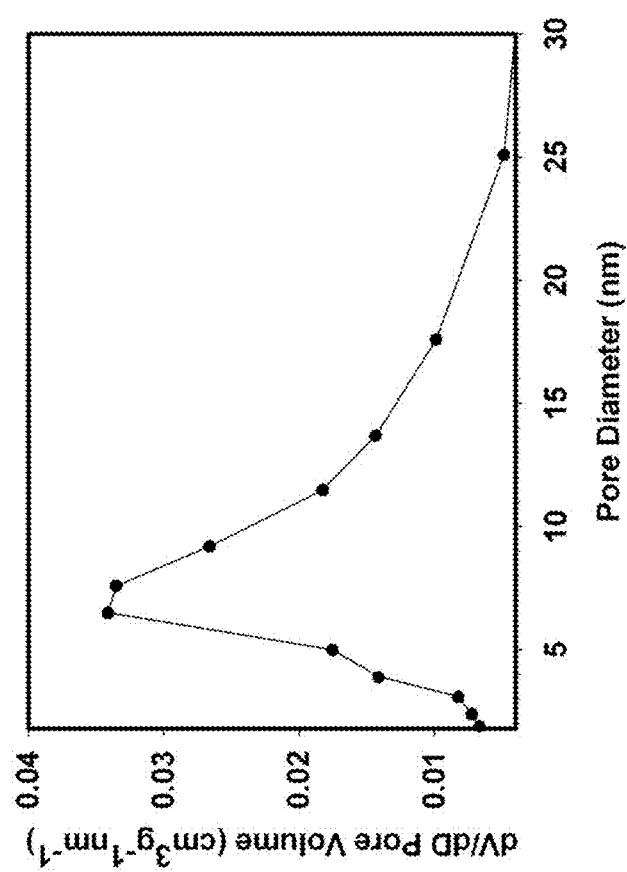
FIG. 21: is the BJH pore size distribution for Ti-A as determined from the desorption branch of the $N_2$ isotherm at 77 K.

Nitrogen adsorption measurements were performed on the $TiO_2$ samples and the results are shown as the lower traces in FIGS. 6 and 8 (for the BJH pore size distributions, see FIGS. 20 and 21). The BET surface areas of Ti—P and Ti-A are 234 and 149 $m^2/g$ respectively with corresponding pore volumes of 0.23 and 0.31 $cm^3/g$ and peak pore diameters of 4 and 7 nm. In contrast, the BET surface area of Ti—C is only 18 $m^2/g$, clearly demonstrating the importance of the hard template for obtaining a high surface area mesoporous material. It is interesting to note that the shapes of the adsorption isotherms (FIGS. 6 and 8) and the relative magnitudes of surface area, pore volume, and pore size for Ti-A and Ti—P reflect those of the corresponding silica templates. This demonstrates that the mesoporosity of the hard templates affects the mesoporosity of the products. The specific surface areas and pore volumes of $TiO_2$ templated by chiral nematic mesoporous silica compares well with $TiO_2$ that has been templated by other mesoporous silica hosts as well as mesoporous $TiO_2$ prepared by completely different methods.

Figure 22:
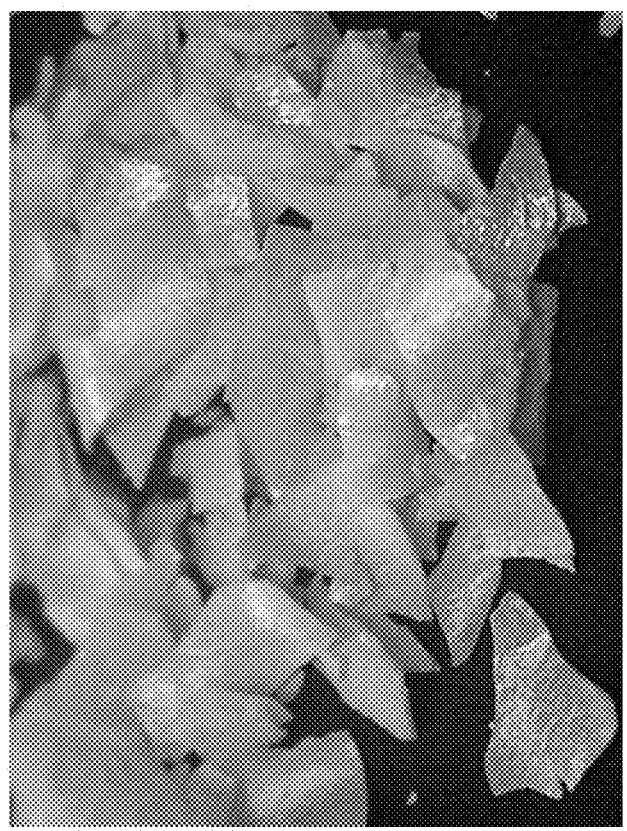
FIG. 22: is a photograph of Ti-A.

The Ti-A films are visibly iridescent under ambient light (FIG. 22) giving a good indication that the chiral nematic structure of the mesoporous silica is at least partially retained in the $TiO_2$ replicas. The iridescence of the Ti-A films is much more pronounced compared to the iridescence of the Ti—P films. Additionally, the Ti-A films are generally larger than the Ti—P films and samples up to about 1 cm across were prepared. These observations suggest that long-range structural replication is more effective when using Si-A as the template. This may be due to the larger mesopores of Si-A allowing for more efficient diffusion, which in turn leads to a more even loading of the hard template films and better long-range replication when compared to Si—P. The following discussion relating the optical and structural properties of the mesoporous titania and silica films is mainly limited to Ti-A and Si-A.

Figure 23:
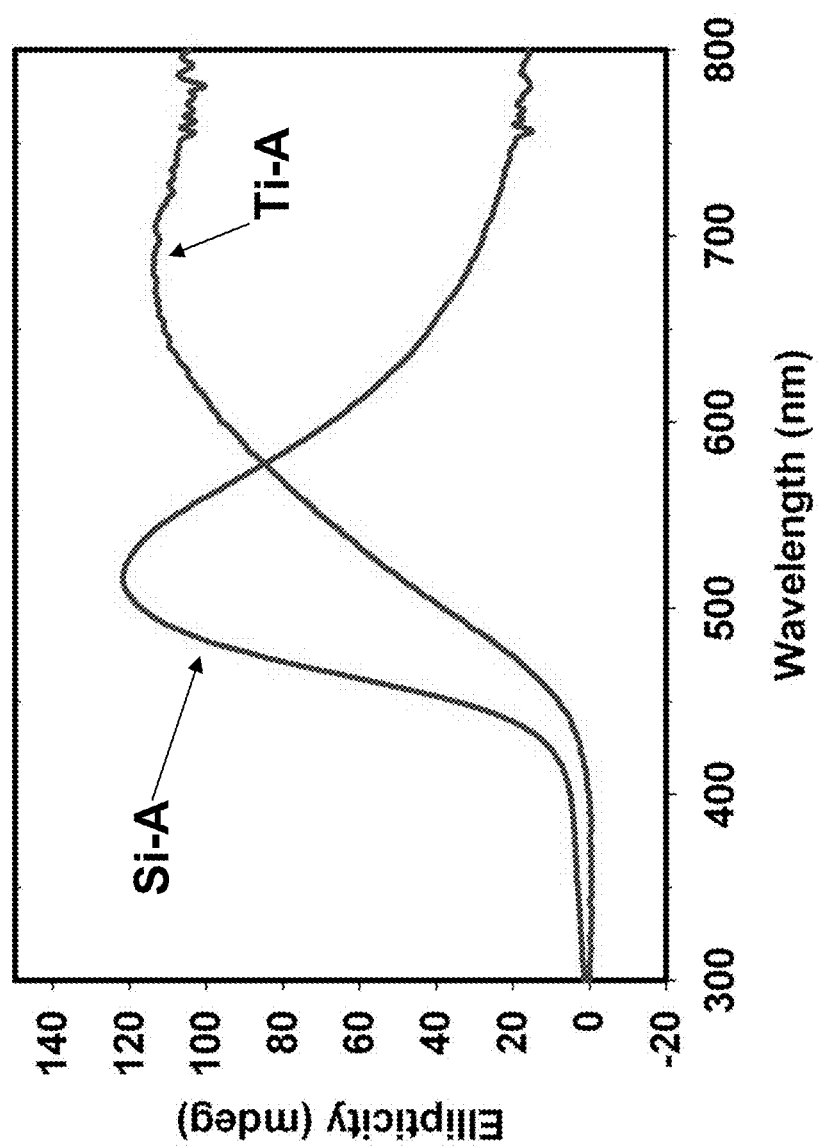
FIG. 23: is the circular dichroism (CD) spectra of Si-A and Ti-A. Ti-A was soaked in water prior to data collection.
Figure 24:
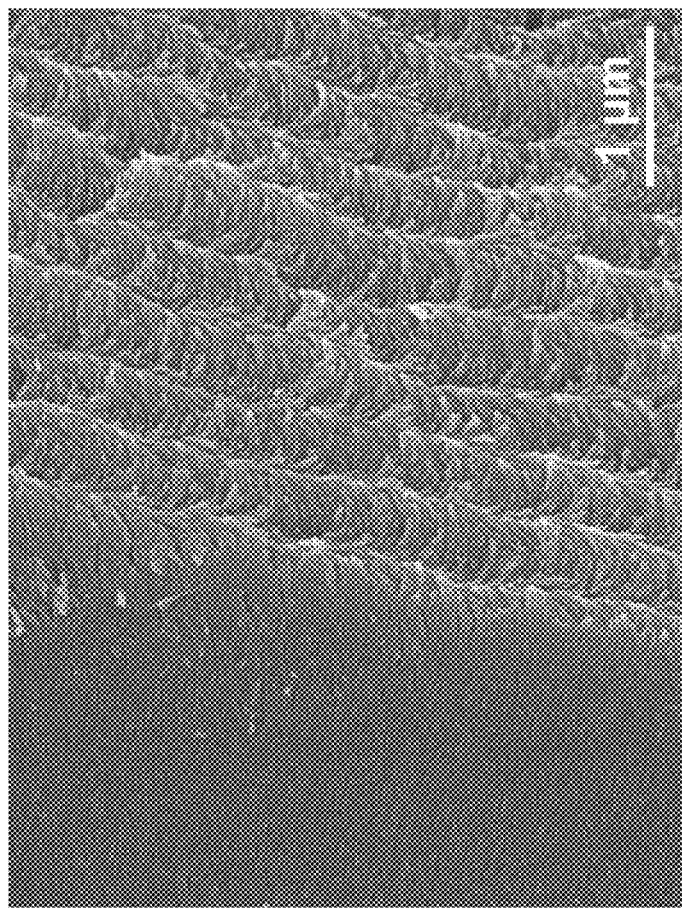
FIG. 24: is a scanning electron micrograph of Si-A perpendicular to the film surface.
Figure 25:
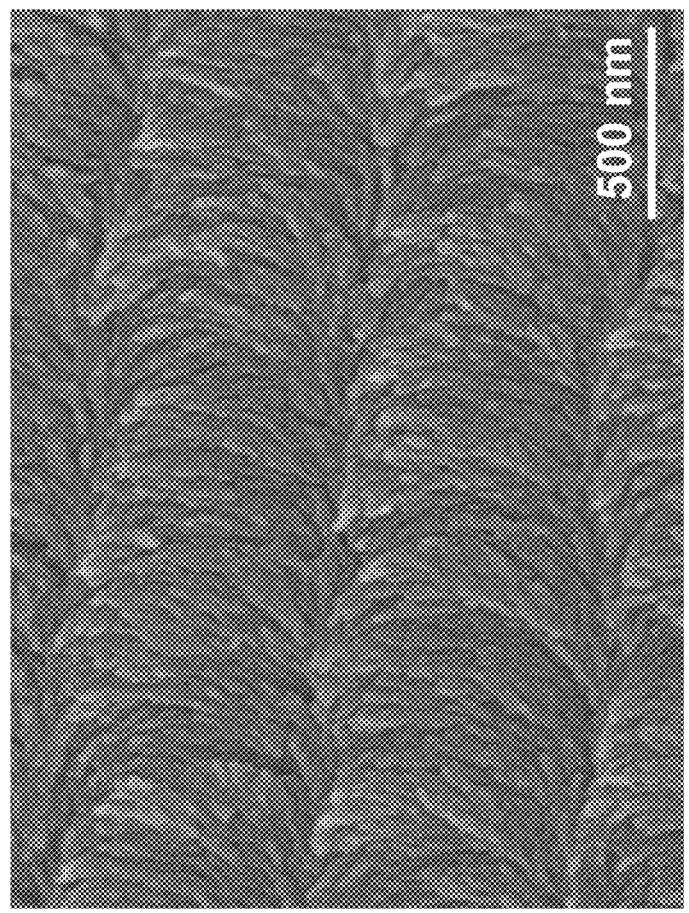
FIG. 25: is a scanning electron micrograph of Si-A parallel to the film surface.
Figure 26:
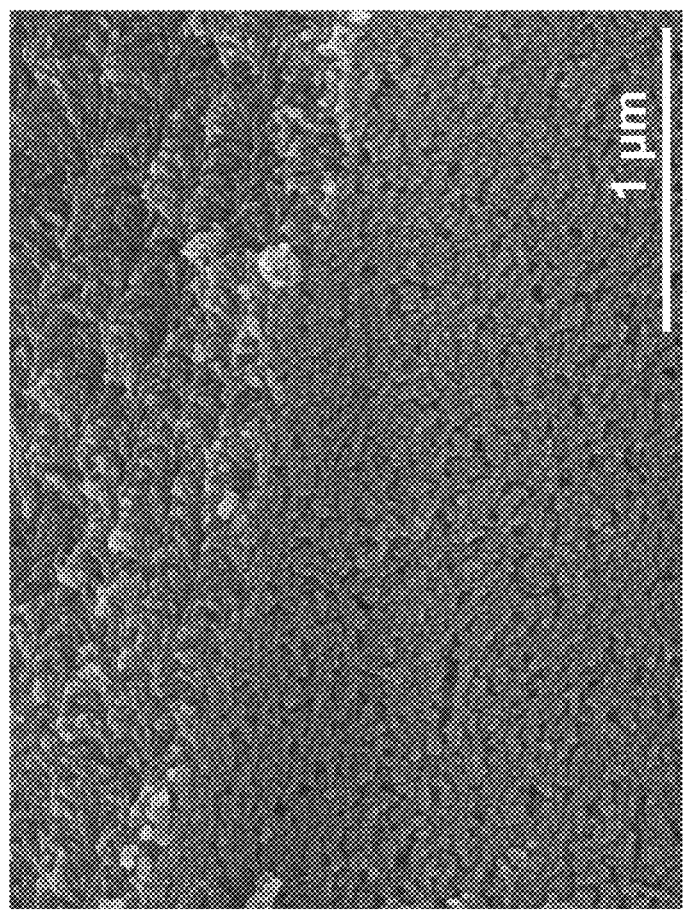
FIG. 26: is a scanning electron micrograph of Ti-A perpendicular to the film surface.
Figure 27:
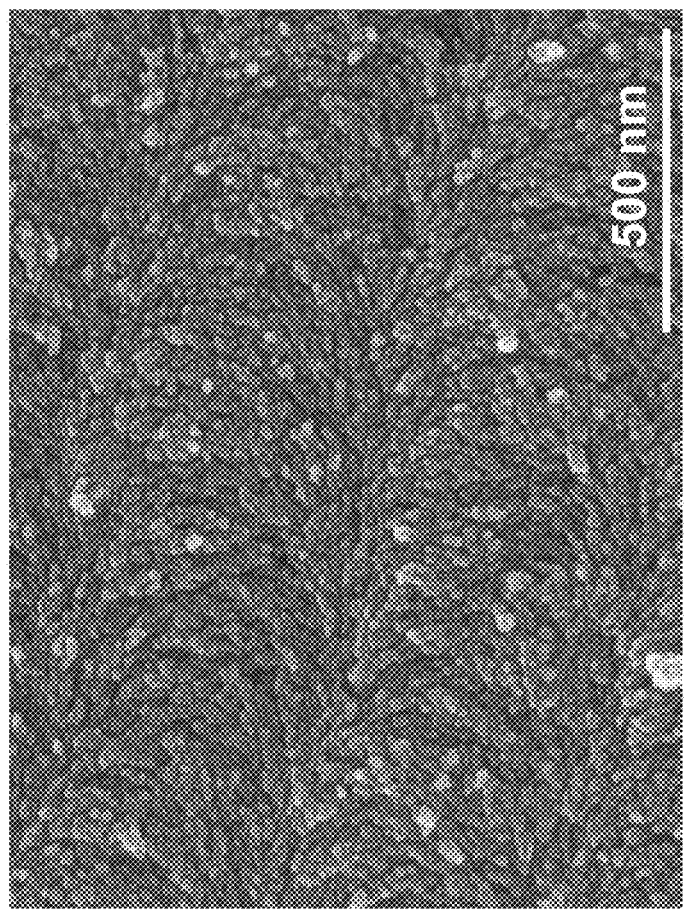
FIG. 27: is a scanning electron micrograph of Ti-A parallel to the film surface.

Iridescence resulting from selective reflection by a chiral nematic structure is associated with a corresponding circular dichroism (CD) signal. The CD spectrum for Si-A shows a very strong peak with positive ellipticity at 517 nm (FIG. 23). The CD spectrum of dry Ti-A gives a weak, very broad positive signal, likely due in part to the opacity of the films. It was found that soaking Ti-A with water increases the transparency of the films without significantly affecting the iridescence, allowing for a more intense CD spectrum to be obtained (FIG. 23). The CD spectrum shows a broad peak centred between 650-700 nm (note that the spectra in FIG. 23 were normalized for comparison; qualitatively Si-A gives a stronger CD signal than Ti-A). The positive ellipticity of the CD peak is the same sign as for Si-A, and indicates that overall the left-handed chiral nematic structure of the silica is successfully transferred to the TiO$_2$ replica. The red-shift of the CD signal for Ti-A compared to Si-A is consistent with the higher refractive index of TiO$_2$ (n=2.5 for anatase) compared to SiO$_2$ (n=1.5).

Figure 28:
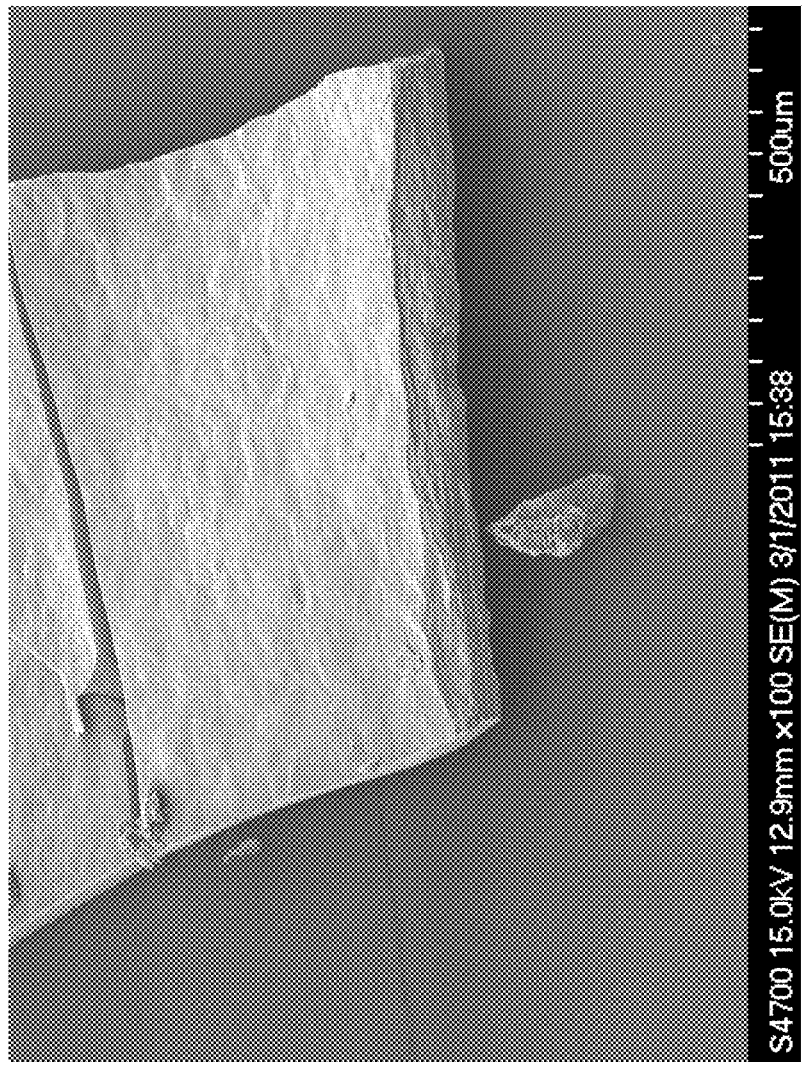
FIG. 28: is a scanning electron micrograph of Ti-A.
Figure 29:
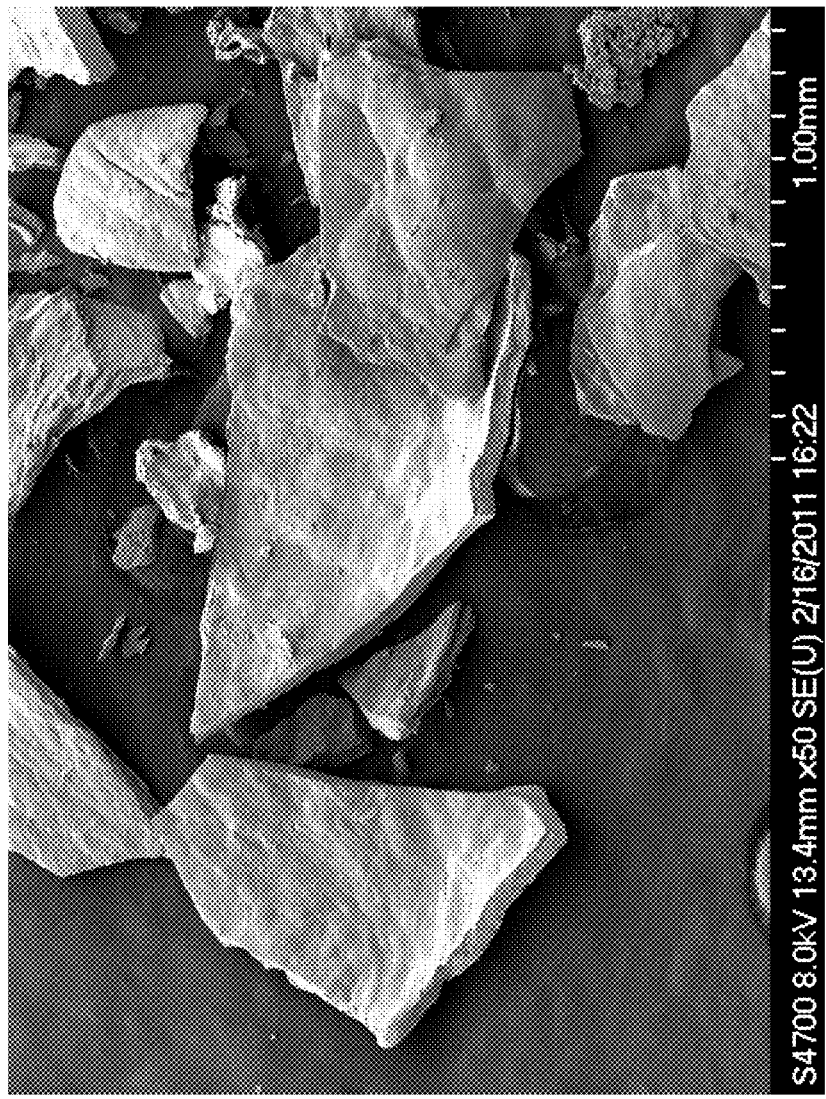
FIG. 29: is a scanning electron micrograph of Ti—P.
Figure 30:
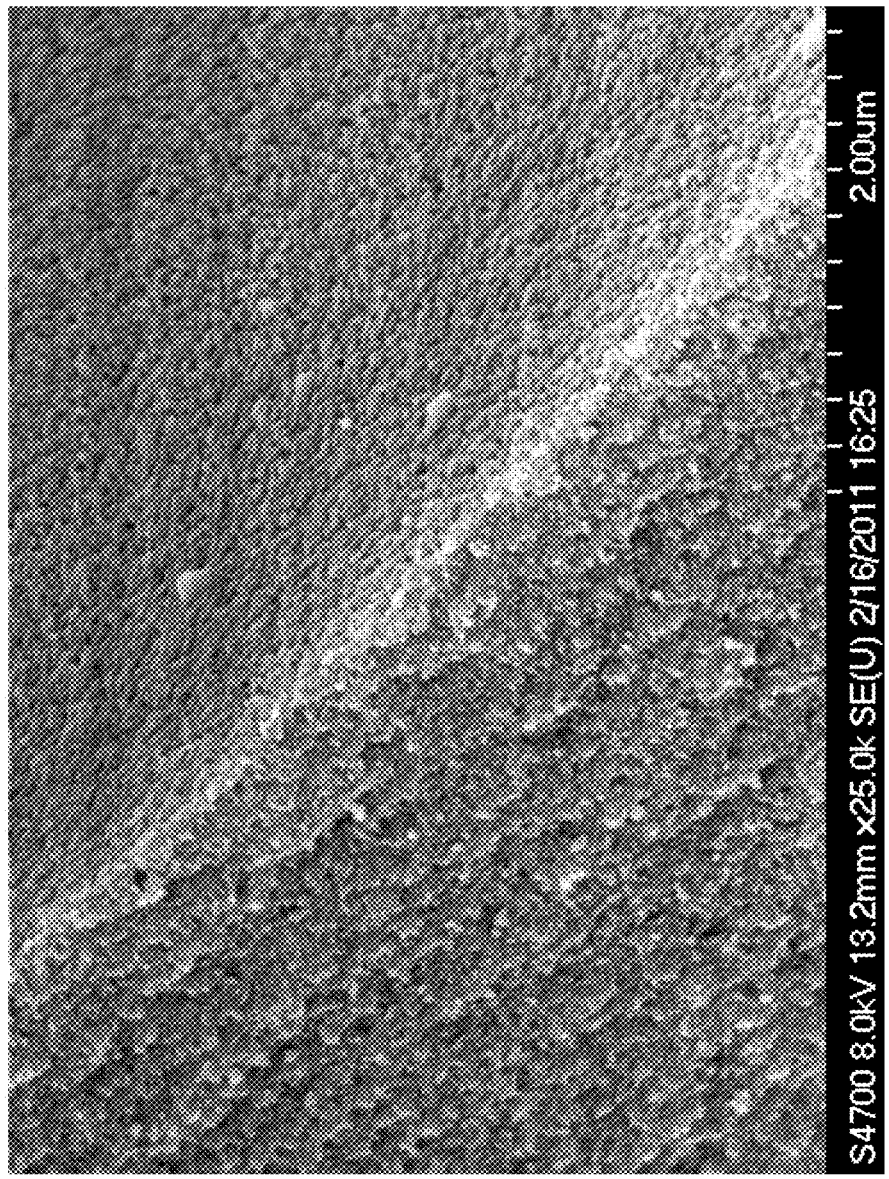
FIG. 30: is a scanning electron micrograph of Ti—P.

Scanning electron microscopy (SEM) further confirms the transfer of the chiral nematic structure from Si-A to Ti-A (FIGS. 24-27). A repeating helical structure is observed perpendicular to the surface of the films for both Si-A and Ti-A. One major difference between Si-A and Ti-A is that the former is amorphous while the latter is nanocrystalline. This is clearly seen when comparing the surface of the films where the surface of Ti-A appears much rougher due to the nanocrystalline morphology. The crystallization of TiO$_2$ drives the formation of more globular particles compared to the rod morphology of Si-A (and the original NCC template). Thus, the helical organization of Ti-A appears less ordered when compared to Si-A. The apparent disruption in long-range order caused by the formation of nanocrystals helps to explain the broadness of the CD signal measured for Ti-A. In certain experiments, a TiO$_2$ "crust" coating was observed on some of the TiO$_2$ films, likely due to some of the TiCl$_4$ solution condensing on the surface of the films as opposed to within the mesopores. This is due to the imperfect loading achieved using the relatively crude incipient wetness technique and could likely be overcome by using an alternative technique such as atomic layer deposition. FIG. 28 shows an SEM image of a film of Ti-A. FIGS. 29 and 30 show SEM images of Ti—P.

Figure 31:
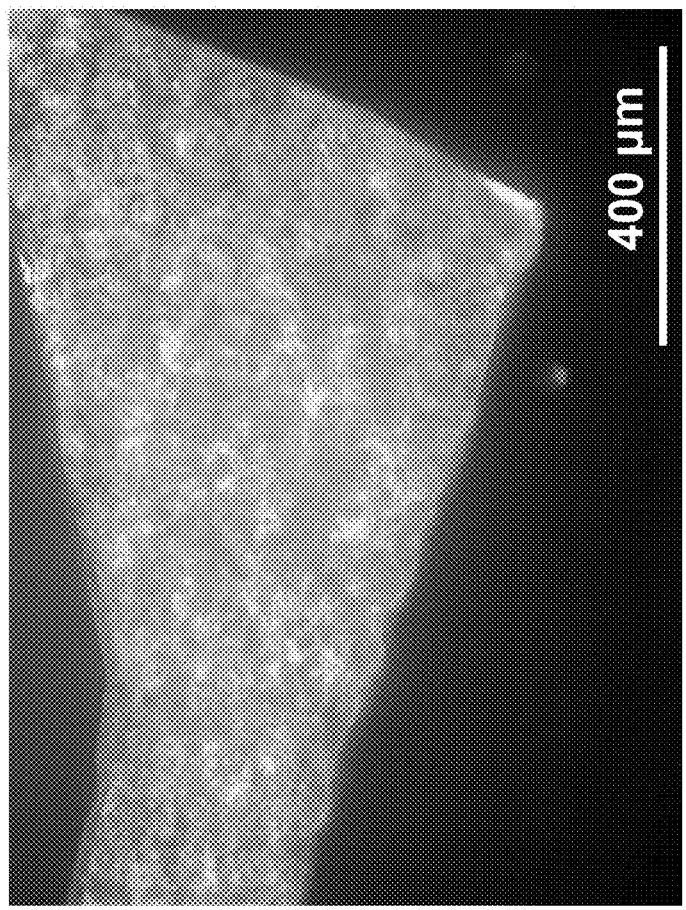
FIG. 31: is a polarized optical micrograph of dry Ti-A.
Figure 32:
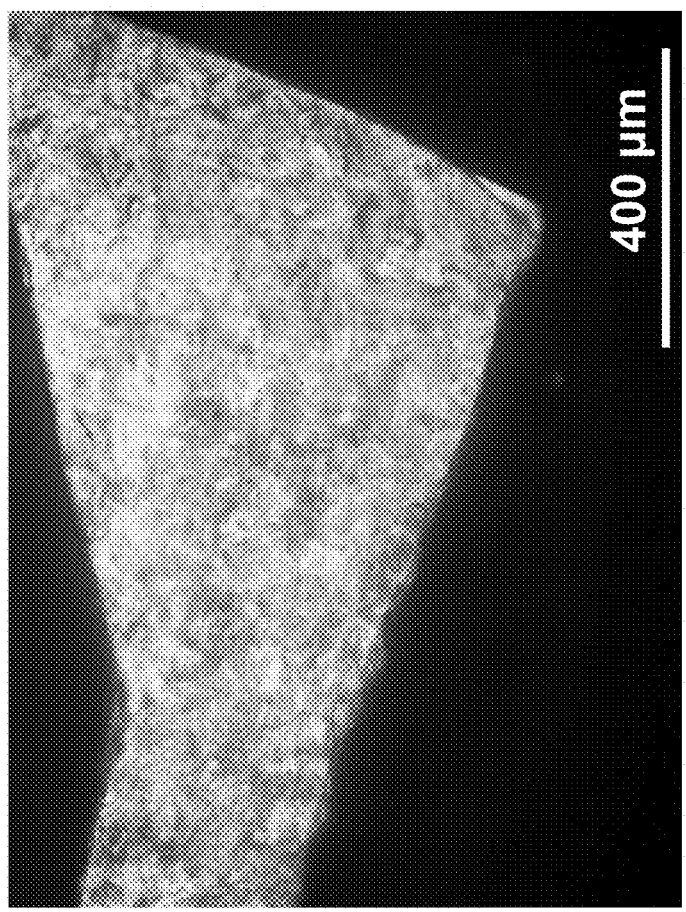
FIG. 32: is a polarized optical micrograph of Ti-A soaked with ethanol.

Looking at Ti-A using polarized optical microscopy (POM), the films are strongly birefringent (FIG. 31) further confirming the long-range anisotropy of the materials. Upon the addition of ethanol, the films remain birefringent but a large change in coloration is observed when viewed under crossed polarizers (FIG. 32). This change is reversible and the films regain their original colour when the ethanol has evaporated. This marked change in birefringence gives clear evidence that the pores of the mesoporous TiO$_2$ are accessible to guest molecules and that pore infiltration can cause a change in optical properties. The change in birefringence upon solvent loading of the TiO$_2$ films is markedly different than for the SiO$_2$ films. When isotropic liquids (e.g., water or ethanol) are added to Si-A or Si—P, the iridescence and birefringence of the films are almost completely shut off.[32] This effect may be attributed to refractive index matching since the refractive index of SiO$_2$ closely matches those of the isotropic liquids that were investigated. The refractive index of TiO$_2$, however, is much higher than that of SiO$_2$. It may therefore be expected that a smaller change in the optical properties of the TiO$_2$ films would occur upon soaking with isotropic liquids when compared with the silica materials. These findings demonstrate that the optical response of porous chiral nematic materials can be tailored by changing the optical properties of the "walls".

To summarize, it has been shown for the first time that chiral nematic mesoporous silica can be used as a template to synthesize a metal oxide such as titania via the "hard templating" or nanocasting method. In this hard templating method, structural features are replicated at length scales ranging from nanometers (the individual NCC fibers) to centimeters (the films): (1) the titania has a surface area and pore dimensions that are determined by the porosity of the starting silica template; (2) the material obtained shows a CD signal that indicates a chiral nematic organization of the crystallites; and (3) the material is obtained as a film with similar dimensions as the starting film. As the hard templating method has been applied to many other materials, it may be expected that this method may be used to create other metal oxide structures with chiral nematic organization by procedures analogous to those described herein, which are the first examples of metal oxides with chiral nematic organization. These materials with high surface area and chiral nematic structures that lead to photonic properties are novel and may be used for photonic applications as well as other applications.

It was surprising in the present invention that the chirality and especially the chiral nematic organization of the mesoporous silica template was maintained in the metal oxide after removal of the template; and it was not predictable that the chiral nematic organization or even chirality of the mesoporous silica template would be transferred to the metaloxide.

While the mesoporous silica template is conveniently removed, with maintenance of the chirality or the chiral nematic organization in the metal oxide, with a strong base such as sodium hydroxide in water, other agents may be employed to remove the template, for example aqueous hydrogen fluoride or tetrabutyl ammonium fluoride.

In the chiral nematic organisation in material of the present invention, the pores are organised into a helical structure where the helix typically repeats every 100 nm to 2000 nm. This is quite different from materials such as those of Gedanken[31] where chirality is only defined over a spacing of about 1 nm, and is in particular a local chirality only at the surface of the material.

EXAMPLES

In the examples, sonication was applied to ensure that the NCC particles were dispersed. The sonicator was a standard laboratory model (2 A, 120 V) available from VWR (Aquasonic model 50T). A sonication time of 10-15 minutes was typically applied prior to addition of the silicon-containing compound.

Figure 4:
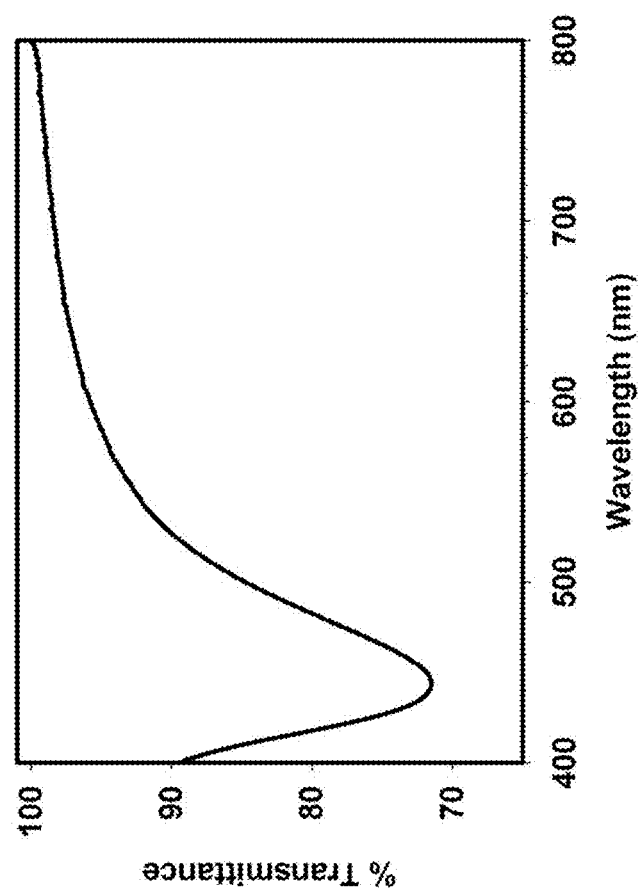
FIG. 4: is a UV-visible spectrum of mesoporous silica sample Si—P.
Figure 5:
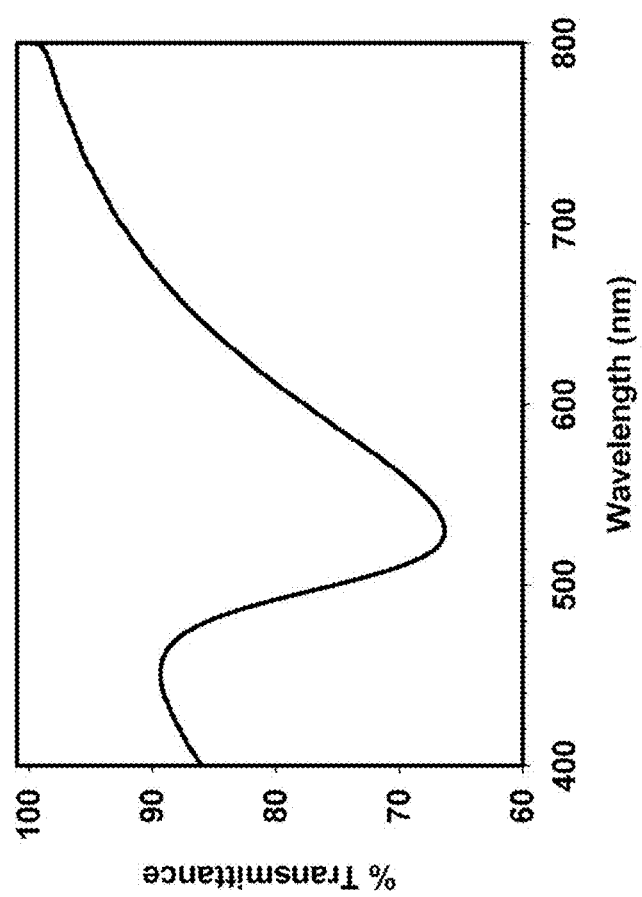
FIG. 5: is a UV-visible spectrum of mesoporous silica sample Si-A.

Preparation of Si—P.

λTetramethoxysilane (TMOS) was added to an aqueous suspension of nanocrystalline cellulose (3 wt. % NCC) at a ratio of 0.4 mL TMOS/10 mL of NCC. After stirring at RT for 1 h, the reaction mixture was poured into polystyrene Petri dishes and allowed to evaporate under ambient conditions. The NCC-silica composite films were pyrolyzed by heating them under air at a rate of 2° C./min to 540° C. and holding them at that temperature for 6 h. Nitrogen gas adsorption measurements gave a surface area of 650 m$^2$/g (BET), peak pore diameter of 4 nm, and pore volume of 0.60 cm$^3$/g (FIG. 6, FIG. 7). UV-visible spectroscopy showed a peak corresponding to reflection at $\lambda_{max}$=445 nm (FIG. 4).

Preparation of Si-A

Tetramethoxysilane (TMOS) was added to an aqueous suspension of nanocrystalline cellulose (3 wt. % NCC) at a ratio of 0.4 mL TMOS/10 mL of NCC. After stirring at RT for 1 h, the reaction mixture was poured into polystyrene Petri dishes and allowed to evaporate under ambient conditions. The NCC-silica composite films (1.88 g) were heated in 12 M HCl (500 mL) at 80° C. for 18 h. The dark brown reaction mixture was filtered and washed with water. The films were then placed in a 4:1 v/v mixture of sulfuric acid and 30% hydrogen peroxide (200 mL total volume) until they appeared completely colorless (ca. 2 min). The films were then isolated by filtration, washed with water, and air dried giving 0.75 g of iridescent mesoporous silica films. Nitrogen gas adsorption measurements gave a surface area of 471 m$^2$/g (BET), peak pore diameter of 9 nm, and pore volume of 0.81 cm$^3$/g (FIG. 8, FIG. 9). UV-visible spectroscopy showed a peak corresponding to reflection at $\lambda_{max}$=530 nm (FIG. 5), and this was correlated with a peak of positive ellipticity in the CD spectrum (FIG. 23), proving that the material has a left-handed chiral structure. Combustion analysis indicated that the sample contained 0.23% C by mass. Scanning electron micrographs indicated that the silica films have a structure similar to that of films of nanocrystalline cellulose (see FIGS. 24 and 25).

Preparation of Ti-A and Ti—P

A fresh TiCl$_4$ solution was first prepared as follows: Titanium (IV) isopropoxide (4 mL) was dissolved in ethanol (36 mL) and then water (10 mL) was added. The white Ti(OH)$_4$ solid that formed was filtered and dried under air. Ti(OH)$_4$ (1 g) was then dissolved in 12 M HCl (2 mL) to give a TiCl$_4$ solution.

The TiCl$_4$ solution was added to the mesoporous silica using the incipient wetness method. A volume of TiCl$_4$ solution equivalent to the pore volume of mesoporous silica used was added to the silica films. For example, Ti-A (pore volume of Si-A=0.81 cm$^3$/g) was prepared by adding 105 μL of TiCl$_4$ solution to 130 mg of Si-A. The TiCl$_4$ loaded films were then dried at 80° C. for 30 min before heating to 200° C. for 1 h under air to induce TiO$_2$ formation. This procedure was repeated four times in total to ensure sufficient pore loading of the films. After the final loading step, the TiO$_2$/SiO$_2$ films were annealed at 600° C. to facilitate TiO$_2$ crystallization giving 202 mg of TiO$_2$/SiO$_2$ composite films. The composite films were then placed in 10 mL of a 2 M NaOH solution for 18 h at 20° C. to selectively remove the silica. The resulting TiO$_2$ films were then recovered by filtration, washed with copious amounts of water, and allowed to air dry giving 117 mg of Ti-A. Sample Ti—P was prepared by an analogous procedure. Ti—C was prepared by the same procedure in a vial that did not contain any mesoporous silica template.

Figure 13:
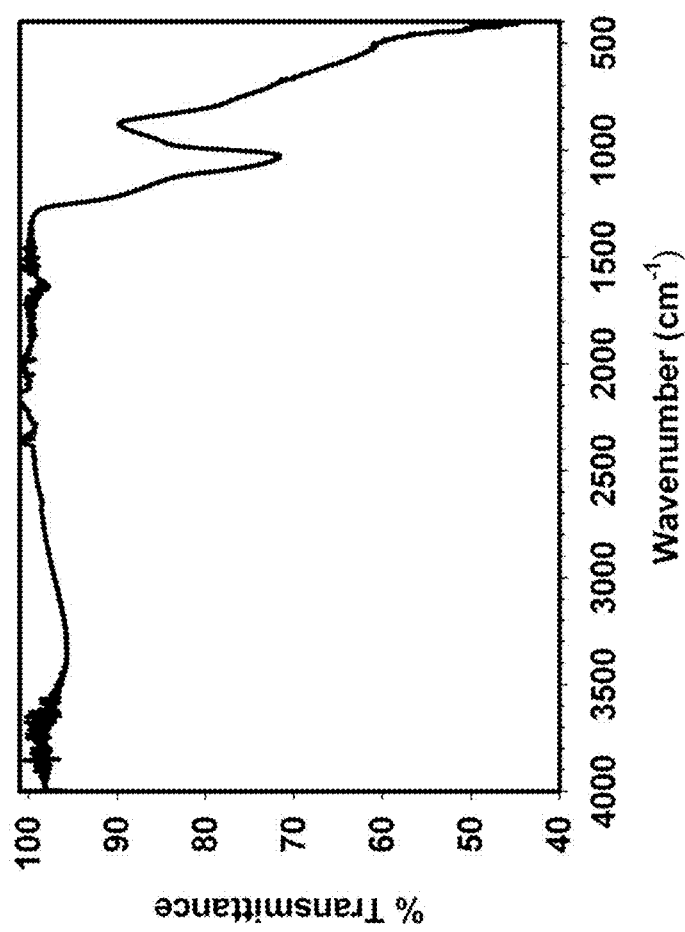
FIG. 13: is the IR spectrum of Ti-A before removing silica.
Figure 15:
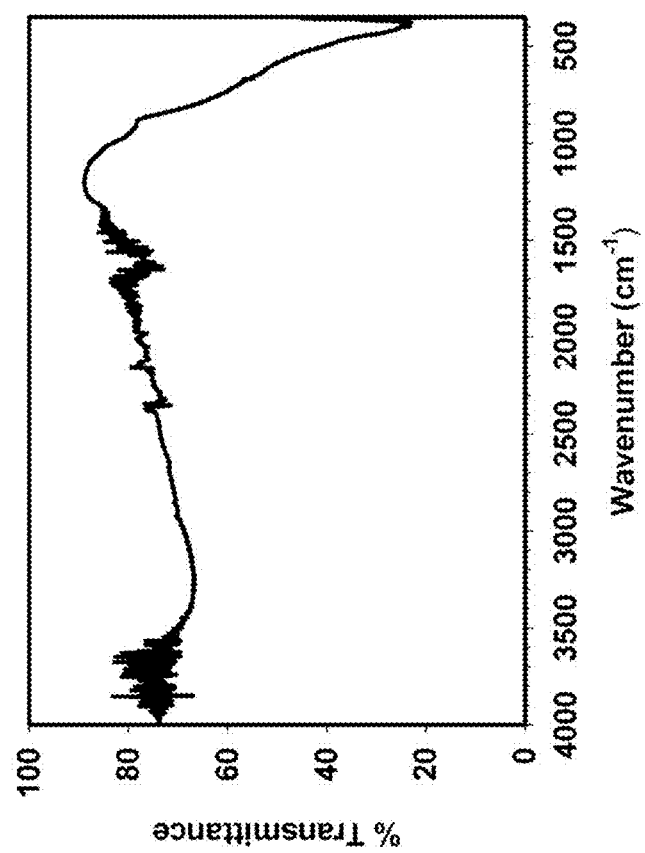
FIG. 15: is the IR spectrum of Ti-A.

Nitrogen gas adsorption measurements of Ti-A gave a surface area of 149 m$^2$/g (BET), peak pore diameter of 7 nm, and pore volume of 0.31 cm$^3$/g (FIG. 8, FIG. 21). The IR spectrum of Ti-A indicated that the silica was essentially removed (FIG. 13 and FIG. 15). Powder X-ray diffraction of Ti-A revealed that it is a crystalline material and corresponds to the anatase form of titania (FIG. 17). Energy dispersive X-ray analysis of Ti-A (FIG. 16) showed that it contains mostly titanium and oxygen, with only a small quantity (Si:Ti mole ratio of less than 0.05:1 was observed). A CD signal of Ti-A after soaking in water was observed, and it had positive ellipticity (FIG. 23), consistent with a chiral nematic organization. Scanning electron micrographs of Ti-A indicated that features of the starting silica material are present in the titania, confirming a templating of the original silica structure (see FIGS. 26-28) and that the materials are available as films. Ti-A appears iridescent when viewed under ambient light (FIG. 22) and strongly birefringent when viewed under crossed polarizers (FIG. 31).

Figure 12:
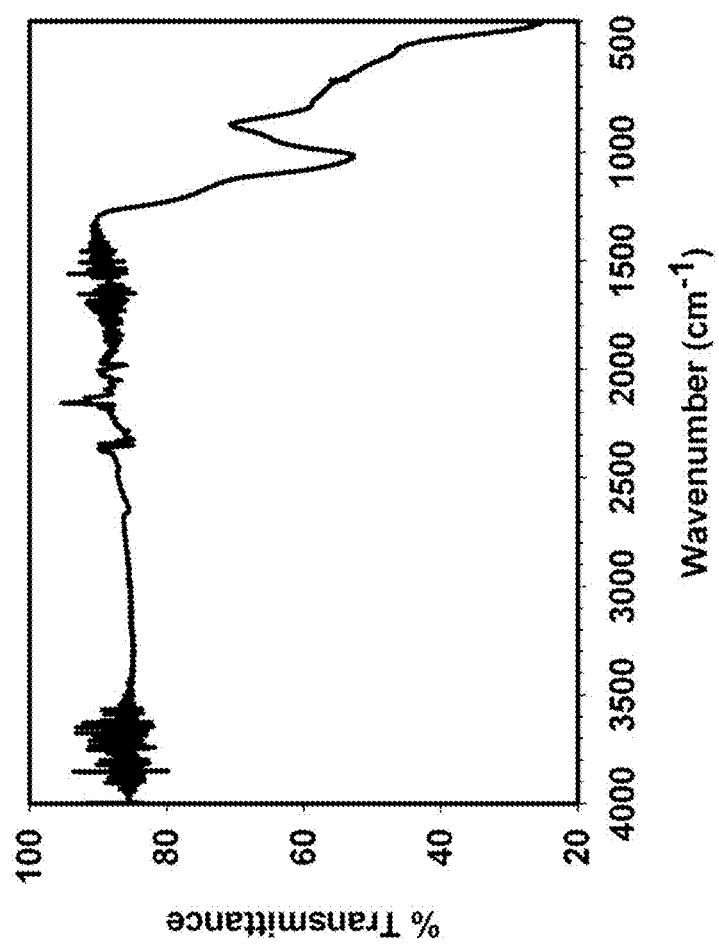
FIG. 12: is the IR spectrum of Ti—P before removing silica.
Figure 14:
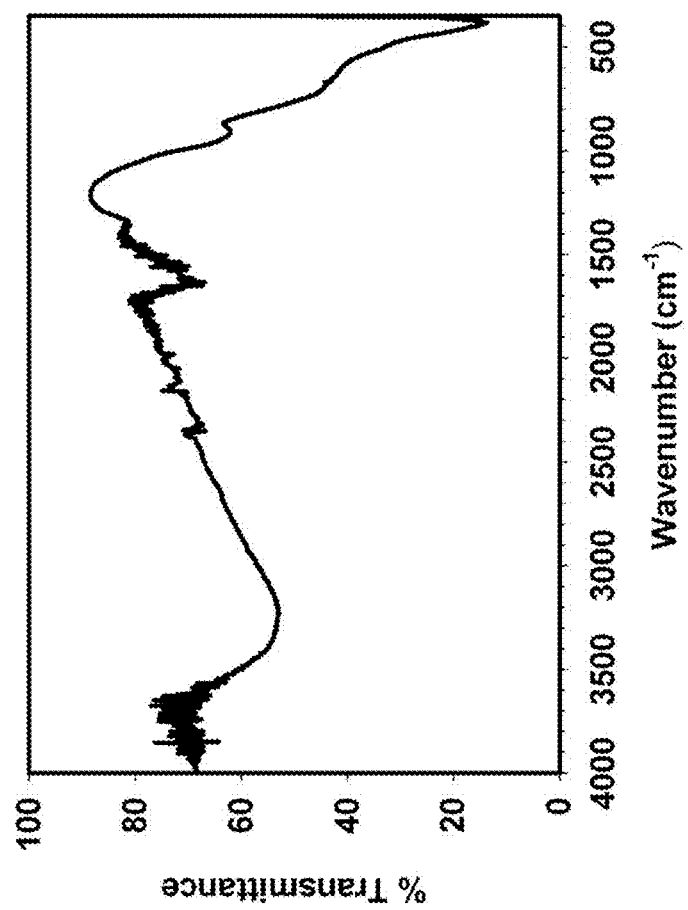
FIG. 14: is the IR spectrum of T—P.

Nitrogen gas adsorption measurements of Ti—P gave a surface area of 234 m$^2$/g (BET), peak pore diameter of 4 nm, and pore volume of 0.23 cm$^3$/g (FIG. 6, FIG. 20). The IR spectrum of Ti—P indicated that the silica was essentially removed (FIG. 12 and FIG. 14). Powder X-ray diffraction of Ti—P revealed that it is a crystalline material and corresponds to the anatase form of titania (FIG. 18). Scanning electron micrographs of Ti—P indicated that features of the starting silica material are present in the titania, confirming a templating of the original silica structure (see FIGS. 29 and 30) and that the materials are available as films. Ti—P appears iridescent when viewed under ambient light and strongly birefringent when viewed under crossed polarizers.

Nitrogen gas adsorption measurements of Ti—C gave a surface area of 18 m$^2$/g (BET), peak pore diameter of 12 nm, and pore volume of 0.06 cm$^3$/g. Powder X-ray diffraction of Ti—C revealed that it is mostly rutile titania with some anatase also present. Ti—C is obtained as a white powder without any iridescence and shows no birefringence when viewed under crossed polarizers.

REFERENCES

1. Lu, A.-H., Scüth, F., Nanocasting: A Versatile Strategy for Creating Nanostructured Porous Materials. *Adv. Mater.* 18, 1793-1805 (2006).
2. Yang, H., Zhao, D. Synthesis of replica mesostructures by the nanocasting strategy. *J. Mater. Chem.* 15, 1217-1231 (2005).
3. Caruso, R. A., Nanocasting and Nanocoating. *Top. Curr. Chem.* 226, 91-118 (2003).
4. Ryoo, R., Joo, S. H., Jun, S., Synthesis of Highly Ordered Carbon Molecular Sieves via Template-Mediated Structural Transformation. *J. Phys. Chem. B* 103, 7743-7746 (1999).
5. Lee, J., Yoon, S., Hyeon, T., Oh, S. M., Kim, K. B., Synthesis of a new mesoporous carbon and its application to electrochemical double-layer capacitors. *Chem. Commun.* 2177-2178 (1999).
6. Liu, H., Wang, G., Liu, J., Qiao, S., Ahn, H., Highly ordered mesoporous NiO anode material for lithium ion batteries with an excellent electrochemical performance. *J. Mater. Chem.* 21, 3046-3052 (2011).
7. Li, W.-C., Nong, G.-Z., Lu, A.-H., Hu, H.-Q., Synthesis of nanocast ordered mesoporous carbons and their application as electrode materials for supercapacitor. *J. Porous Mater.* 18, 23-30 (2011).
8. Armatas, G. S., Katsoulidis, A. P., Petrakis, D. E., Pomonis, P. J., Kanatzidis, M. G., Nanocasting of Ordered Mesoporous Co$_3$O$_4$-Based Polyoxometalate Composite Frameworks. *Chem. Mater.* 22, 5739-5746 (2010).
9. Waitz, T., Becker, B., Wagner, T., Sauerwald, T., Kohl, C.-D., Tiemann, M., Ordered nanoporous SnO$_2$ gas sensors with high thermal stability. *Sens. Actuators B* 150, 788-793 (2010).
10. Garcia, T., Agouram, S., Sanchez-Royo, J. F., Murillo, R., Mastral, A. M., Aranda, A., Vazquez, I., Dejoz, A., Solsona, B., Deep oxidation of volatile organic compounds using ordered cobalt oxides prepared by a nanocasting route. *Appl. Cat. A: General* 386, 16-27 (2010).
11. Kresge, C. T., Leonowicz, M. E., Roth, W. J., Vartuli, J. C., Beck, J. S., Ordered mesoporous molecular sieves synthesized by a liquid-crystal template mechanism. *Nature* 359, 710-712 (1992).
12. Wan, Y., Zhao, D., On the Controllable Soft-Templating Approach to Mesoporous Silicates. *Chem. Rev.* 107, 2821-2860 (2007).
13. Liang, C., Li, Z., Dai, S. Mesoporous Carbon Materials: Synthesis and Modification. *Angew. Chem. Int. Ed.* 47, 3696-3717 (2008).
14. Thomas, A., Goettmann, F., Antonietti, M., Hard Templates for Soft Materials: Creating Nanostructured Organic Materials. *Chem. Mater.* 20, 738-755 (2008).
15. Han, Y.-J., Kim, J. M., Stucky, G. D., Preparation of Noble Metal Nanowires Using Hexagonal Mesoporous Silica SBA-15. *Chem. Mater.* 12, 2068-2069 (2000).
16. Sakamoto, Y., Ohsuna, T., Hiraga, K., Terasaki, O., Ko, C. H., Shin, H. J., Ryoo, R., TEM Studies of Platinum Nanowires Fabricated in Mesoporous Silica MCM-41. *Angew. Chem., Int. Ed.* 39, 3107-3110 (2000).

17. Tian, B., Liu, X., Solovyov, L. A., Liu, Z., Yang, H., Zhang, Z., Xie, S., Zhang, F., Tu, B., Yu, C., Terasaki, O., Zhao, D., Facile Synthesis and Characterization of Novel Mesoporous and Mesorelief Oxides with Gyroidal Structures. *J. Am. Chem. Soc.* 126, 865-875 (2004).
18. Tian, B., Liu, X., Yang, H., Xie, S., Yu, C., Tu, B., Zhao, D., General Synthesis of Ordered Crystallized Metal Oxide Nanoarrays Replicated by Microwave-Digested Mesoporous Silica. *Adv. Mater.* 15, 1370-1274 (2003).
19. Yue, W., Xu, X., Irvine, J. T. S., Attidekou, P. S., Liu, C., He, H., Zhao, D., Zhou, W. Mesoporous Monocrystalline $TiO_2$ and Its Solid-State Electrochemical Properties. *Chem. Mater.* 21, 2540-2546 (2009).
20. Yue, W.; Random, C.; Attidekou, P. S.; Su, Z.; Irvine, J. T. S.; Zhou, W. Synthesis, Li Insertion, and Photoactivity of Mesoporous Crystalline $TiO_2$. *Adv. Funct. Mater.* 19, 2826-2833 (2009).
21. Chae, W.-S., Lee, S.-W., Kim, Y.-R. Templating Route to Mesoporous Nanocrystalline Titania Nanofibers. *Chem. Mater.* 17, 3072-3074 (2005).
22. O'Regan, B., Gratzel, M. A low-cost, high-efficiency solar cell based on dye-sensitized colloidal $TiO_2$ films. *Nature* 353, 737-740 (1991).
23. Zhang, S., Jiang, D., Tang, T., Li, J., Xu, Y., Shen, W., Xu, J., Deng, F. $TiO_2$/SBA-15 photocatalysts synthesized through the surface acidolysis of $Ti(O''Bu)_4$ on carboxyl-modified SBA-15. *Catal. Today* 158, 329-335 (2010).
24. Guidi, V., Carotta, M. C., Ferroni, M., Martinelli, G., Paglialonga, L., Comini, E., Sberveglieri, G., Preparation of nanosized titania thick and thin films as gas-sensors. *Sens. Actuators, B* 57, 197-200 (1999).
25. Wang, C., Yin, L., Zhang, L., Qi, Y., Lun, N., Liu, N., Large Scale Synthesis and Gas-Sensing Properties of Anatase $TiO_2$ Three-Dimensional Hierarchical Nanostructures. *Langmuir* 26, 12841-12848 (2010).
26. Djenizian, T., Hanzu, I., Knauth, P., Nanostructured negative electrodes based on titania for Li-ion microbatteries. *J. Mater. Chem.* 21, 9925-9937 (2011).
27. Wijnhoven, J. E. G. J., Vos, W. L., Preparation of Photonic Crystals Made of Air Spheres in Titania. *Science* 281, 802-804 (1998).
28. Schroden, R. C., Al-Daous, M., Blanford, C. F., Stein, A., Optical Properties of Inverse Opal Photonic Crystals. *Chem. Mater.* 14, 3305-3315 (2002).
29. Xu, Y., Zhu, X., Dan, Y., Moon, J. H., Chen, V. W., Johnson, A. T., Perry, J. W., Yang, S. Electrodeposition of Three-Dimensional Titania Photonic Crystals from Holographically Patterned Microporous Polymer Templates. *Chem. Mater.* 20, 1816-1823 (2008).
30. Chen, J. I. L., von Freymann, G., Choi, S. Y., Kitaev, V., Ozin, G. A., Amplified Photochemistry with Slow Photons. *Adv. Mater.* 18, 1915-1919 (2006).
31. Gabashvili, A., Major, D. T., Perkas, N., Gedanken, A. The sonochemical synthesis and characterization of mesoporous chiral titania using a chiral inorganic precursor. *Ultrasonics Sonochemistry* 17, 605-609 (2010).
32. Shopsowitz, K. E., Qi, H., Hamad, W. Y. & MacLachlan, M. J. Free-Standing Mesoporous Silica Films with Tunable Chiral Nematic Structures. *Nature* 468, 422-425 (2010).
33. MacLachlan, M. J. et al., Inorganic Mesoporous Materials with Chiral Nematic Structures and Preparation Method Thereof, U.S. patent application Ser. No. 13/076,469 filed Mar. 31, 2011.
34. Zhang, H. & Banfield, J. F. Thermodynamic analysis of phase stability of nanocrystalline titania. *J. Mater. Chem.* 8, 2073-2076 (1998).

The invention claimed is:

1. A mesoporous metal oxide having chiral nematic order and crystallinity in the form of an iridescent film, wherein said oxide is titanium oxide.

2. The mesoporous metal oxide of claim 1, wherein said titanium oxide is anatase titanium oxide.

3. The mesoporous metal oxide of claim 1, wherein said chiral nematic order is in a length scale ranging from nanometers to centimeters.

4. A process for producing a mesoporous metal oxide having chiral nematic order and crystallinity, comprising: introducing a metal oxide precursor into a mesoporous silica template in film form, said template defining chiral nematic order, converting said precursor to metal oxide, and removing said silica template.

5. A process according to claim 4, wherein said precursor is a precursor of a metal oxide selected from the group consisting of titanium oxide, tin dioxide, iron oxide, tantalum oxide and vanadium oxide.

6. A process according to claim 4, wherein said precursor is a precursor of titanium oxide.

7. A process according to claim 4, wherein said precursor is a compound of the metal of said oxide, which compound is hydrolysable to the metal oxide.

8. A process according to claim 6, wherein said precursor is titanium chloride.

9. A process according to claim 4, wherein said silica template is removed with aqueous sodium hydroxide.

10. A process according to claim 4, wherein said silica template is first produced by acid hydrolysis of cellulose in a siliceous composite selected from the group consisting of silica/nanocrystalline cellulose composites and organosilica/nanocrystalline cellulose composites to produce a mesoporous siliceous material from which nanocrystalline cellulose has been removed by said acid hydrolysis.

11. A process according to claim 8, wherein said silica template is first produced by a) reacting a siliceous precursor in an aqueous suspension of nanocrystalline cellulose (NCC) to form an aqueous mixture of siliceous material and NCC in which said NCC has chiral nematic order, b) casting said mixture, c) removing water from the cast mixture to produce a composite of NCC in a siliceous material matrix, said composite having said chiral nematic order, and d) removing said NCC from said composite while maintaining the integrity of the siliceous material matrix with said chiral nematic order.

12. A process according to claim 4, further comprising annealing said metal oxide prior to the removing of said silica template.

13. A process according to claim 11, further comprising annealing said metal oxide prior to the removing of said silica template.

14. A mesoporous metal oxide having chiral nematic order and crystallinity in the form of an iridescent film, wherein said oxide is selected from the group consisting of titanium oxide, iron oxide, tantalum oxide and vanadium oxide.

* * * * *